(12) United States Patent
Bedu-Addo et al.

(10) Patent No.: US 12,551,460 B2
(45) Date of Patent: Feb. 17, 2026

(54) METHODS AND COMPOSITIONS COMPRISING CATIONIC LIPIDS FOR STIMULATING TYPE 1 INTERFERON GENES

(71) Applicant: PDS BIOTECHNOLOGY COPORATION, New Brunswick, NJ (US)

(72) Inventors: Frank Bedu-Addo, Stamford, CT (US); Gregory Conn, Madrid (ES); Siva K. Gandhapudi, Blue Ash, OH (US); Martin Ward, Lexington, KY (US); Jerold Woodward, Lexington, KY (US)

(73) Assignee: PDS BIOTECHNOLOGY COPORATION, Princeton, NJ (US)

( * ) Notice: Subject to any disclaimer, the term of this patent is extended or adjusted under 35 U.S.C. 154(b) by 0 days.

(21) Appl. No.: 16/210,750

(22) Filed: Dec. 5, 2018

(65) Prior Publication Data

US 2019/0321321 A1    Oct. 24, 2019

Related U.S. Application Data

(60) Provisional application No. 62/594,815, filed on Dec. 5, 2017.

(51) Int. Cl.
*A61K 31/21* (2006.01)
*A61K 39/12* (2006.01)

(52) U.S. Cl.
CPC .............. *A61K 31/21* (2013.01); *A61K 39/12* (2013.01)

(58) Field of Classification Search
None
See application file for complete search history.

(56) References Cited

U.S. PATENT DOCUMENTS

| | | |
|---|---|---|
| 2,167,480 A | 7/1939 | Hansell |
| 4,703,004 A | 10/1987 | Hopp et al. |
| 5,264,618 A | 11/1993 | Felgner et al. |
| 5,283,185 A | 2/1994 | Epand et al. |
| 5,334,761 A | 8/1994 | Gebeyehu et al. |
| 5,459,127 A | 10/1995 | Felgner et al. |
| 5,827,703 A | 10/1998 | Debs et al. |
| 6,008,202 A | 12/1999 | Huang et al. |
| 6,124,270 A | 9/2000 | Haensler |
| 6,183,745 B1 | 2/2001 | Tindle et al. |
| 6,214,804 B1 | 4/2001 | Felgner et al. |
| 6,419,931 B1 | 7/2002 | Vitiello et al. |
| 6,464,980 B1 | 10/2002 | Fikes et al. |
| 6,586,409 B1 | 7/2003 | Wheeler |
| 6,610,321 B2 | 8/2003 | Huang et al. |
| 6,649,170 B1 | 11/2003 | Lindblad et al. |
| 6,693,086 B1 | 2/2004 | Dow et al. |
| 6,710,035 B2 | 3/2004 | Felgner et al. |
| 6,780,421 B1 | 8/2004 | Haensler et al. |
| 6,852,334 B1 | 2/2005 | Cullis et al. |
| 7,001,614 B2 | 2/2006 | Smyth-Templeton et al. |
| 7,105,574 B1 | 9/2006 | Wheeler |
| 7,303,881 B2 | 12/2007 | Huang et al. |
| 7,488,791 B2 | 2/2009 | Maillere et al. |
| 8,877,206 B2 | 11/2014 | Chen et al. |
| 9,102,950 B2 | 8/2015 | Hartikka et al. |
| 9,696,686 B2 | 7/2017 | Sticker et al. |
| 9,789,129 B2 * | 10/2017 | Vasievich ............... A61P 31/00 |
| 10,035,832 B2 | 7/2018 | Schlom et al. |
| 10,155,049 B2 | 12/2018 | Bonnet et al. |
| 10,286,050 B2 | 5/2019 | Wood et al. |
| 10,286,064 B2 | 5/2019 | Johnson et al. |
| 10,518,354 B2 | 12/2019 | Lin et al. |
| 10,702,541 B2 | 7/2020 | Vasievich et al. |
| 10,828,364 B2 * | 11/2020 | Johnson .................. A61K 39/12 |
| 11,401,306 B2 * | 8/2022 | Bedu-Addo ............ A61P 37/04 |
| 11,612,652 B2 | 3/2023 | Bedu-Addo et al. |
| 11,638,753 B2 | 5/2023 | Bedu-Addo et al. |
| 11,801,257 B2 * | 10/2023 | Vasievich ............... A61P 37/02 |
| 11,904,015 B2 * | 2/2024 | Bedu-Addo ............ A61P 31/10 |
| 11,911,465 B2 * | 2/2024 | Bedu-Addo ............ A61P 31/12 |
| 12,201,685 B2 * | 1/2025 | Johnson ............. A61K 39/0011 |
| 2001/0026937 A1 | 10/2001 | Punnonen et al. |

(Continued)

FOREIGN PATENT DOCUMENTS

| | | |
|---|---|---|
| CN | 1909918 A | 2/2007 |
| CN | 101027317 A | 8/2007 |

(Continued)

OTHER PUBLICATIONS

Yasuda et al., Endosomal Translocation of Vertebrate DNA Activates Dendritic Cells via TLR9-Dependent and -Independent Pathways, 2005, Journal of Immunology, vol. 174, pp. 6129-6136.*

Zhao, LJ et al., "Interferon alpha regulates MAPK and STAT1 pathways in human hepatoma cells", *Virology Journal*, Apr. 6, 2011, vol. 8, No. 157; pp. 1-7.

Kranz, LM et al., "Systemic RNA delivery to dendritic cells exploits antiviral defence for cancer immunotherapy", *Nature*, Jun. 16, 2016, vol. 534, pp. 396-409.

International Search Report and Written Opinion from counterpart International Application No. PCT/US2018/064060, dated Apr. 30, 2019.

A. Takaoka et al., "Integration of interferon-α/β signaling to p53 responses in tumor suppression and antiviral defense", *Nature*, 2003, vol. 424, pp. 516-523.

(Continued)

*Primary Examiner* — Benjamin P Blumel
(74) *Attorney, Agent, or Firm* — DLA Piper LLP (US)

(57) ABSTRACT

Methods and compositions for modifying type I IFN signaling pathways in a subject comprising the administration a cationic lipid to the subject are provided. The cationic lipids comprise 1,2-dioleoyl-3-trimethylammonium propane (DOTAP), N-1-(2,3-dioleoyloxy)-propyl-N,N,N-trimethyl ammonium chloride (DOTMA), 1,2-dioleoyl-sn-glycero-3-ethylphosphocholine (DOEPC), enantiomers and combinations thereof. The compositions may further comprise one or more antigenic components, wherein such components are autologous or nonautologous.

2 Claims, 9 Drawing Sheets

Specification includes a Sequence Listing.

(56) References Cited

U.S. PATENT DOCUMENTS

| | | |
|---|---|---|
| 2002/0007173 A1 | 1/2002 | Kundig et al. |
| 2002/0187105 A1 | 12/2002 | Zou et al. |
| 2003/0008813 A1 | 1/2003 | Felgner et al. |
| 2003/0228634 A1 | 12/2003 | Simard et al. |
| 2003/0229040 A1 | 12/2003 | Kasid et al. |
| 2004/0106551 A1 | 6/2004 | Khleif et al. |
| 2004/0157791 A1 | 8/2004 | Dow et al. |
| 2004/0170644 A1 | 9/2004 | Mailere et al. |
| 2004/0185057 A1 | 9/2004 | Kirkby et al. |
| 2004/0203051 A1 | 10/2004 | Simard et al. |
| 2005/0025822 A1 | 2/2005 | Wong et al. |
| 2005/0112559 A1 | 5/2005 | Leung et al. |
| 2005/0176672 A1 | 8/2005 | Scheule et al. |
| 2005/0220814 A1 | 10/2005 | Dominowski et al. |
| 2005/0245446 A1 | 11/2005 | Hailes et al. |
| 2006/0008472 A1 | 1/2006 | Huang et al. |
| 2006/0051405 A1 | 3/2006 | Maclachlan et al. |
| 2006/0083780 A1 | 4/2006 | Heyes et al. |
| 2006/0159738 A1 | 7/2006 | Graham et al. |
| 2006/0165708 A1 | 7/2006 | Mayumi et al. |
| 2006/0171956 A1 | 8/2006 | Bareholz et al. |
| 2006/0182793 A1 | 8/2006 | Bachmann et al. |
| 2006/0204566 A1 | 9/2006 | Smyth-Templeton et al. |
| 2006/0223769 A1 | 10/2006 | Dow et al. |
| 2006/0251726 A1 | 11/2006 | Lin et al. |
| 2006/0263804 A1 | 11/2006 | Robinson et al. |
| 2006/0275777 A1 | 12/2006 | Waelti |
| 2006/0286124 A1 | 12/2006 | Burt et al. |
| 2007/0014807 A1 | 1/2007 | Maida |
| 2007/0059318 A1 | 3/2007 | Balu-Iyer et al. |
| 2007/0066552 A1 | 3/2007 | Clarke et al. |
| 2007/0207526 A1 | 9/2007 | Coit et al. |
| 2008/0014251 A1 | 1/2008 | Benz et al. |
| 2008/0014254 A1 | 1/2008 | Platscher et al. |
| 2008/0049957 A1 | 2/2008 | Topholm |
| 2008/0131455 A1 | 6/2008 | Huang et al. |
| 2008/0152665 A1 | 6/2008 | Leclerc et al. |
| 2008/0206286 A1 | 8/2008 | Yu |
| 2008/0248044 A1 | 10/2008 | Choppin et al. |
| 2009/0001705 A1 | 1/2009 | Fischer et al. |
| 2009/0017057 A1 | 1/2009 | Chen et al. |
| 2009/0053251 A1 | 2/2009 | Pogue-Caley et al. |
| 2010/0086584 A1 | 4/2010 | Callejo et al. |
| 2010/0099745 A1 | 4/2010 | Sambhara et al. |
| 2010/0112002 A1 | 5/2010 | Lien et al. |
| 2010/0158939 A1 | 6/2010 | Sambhara et al. |
| 2010/0189742 A1 | 7/2010 | Van der Burg et al. |
| 2010/0203080 A1 | 8/2010 | Maillere et al. |
| 2010/0221223 A1 | 9/2010 | Tsutsui et al. |
| 2010/0239657 A1 | 9/2010 | Kim et al. |
| 2010/0266547 A1 | 10/2010 | Benedict |
| 2010/0297144 A1 | 11/2010 | Roden |
| 2011/0110972 A1* | 5/2011 | Vasievich .............. A61P 37/02 424/196.11 |
| 2011/0117141 A1 | 5/2011 | Huang et al. |
| 2011/0158952 A1 | 6/2011 | Beach et al. |
| 2011/0305713 A1 | 12/2011 | Munn et al. |
| 2012/0064035 A1 | 3/2012 | Hadden et al. |
| 2012/0148622 A1 | 6/2012 | Tenoever |
| 2012/0251445 A1 | 10/2012 | Jiang et al. |
| 2013/0129761 A1 | 5/2013 | Garcia-Sastre et al. |
| 2013/0225663 A1 | 8/2013 | Brown |
| 2013/0243723 A1 | 9/2013 | Hadden et al. |
| 2014/0301179 A1 | 10/2014 | Rich et al. |
| 2015/0079155 A1 | 3/2015 | Jensen et al. |
| 2015/0093410 A1 | 4/2015 | Chen et al. |
| 2015/0110823 A1 | 4/2015 | Bedu-Addo et al. |
| 2015/0132340 A1 | 5/2015 | Johnson et al. |
| 2015/0250872 A1 | 9/2015 | Bedu-Addo et al. |
| 2015/0283219 A1 | 10/2015 | Langlade Demoyen et al. |
| 2015/0343062 A1 | 12/2015 | Kuboyama et al. |
| 2016/0168227 A1 | 6/2016 | Kallen et al. |
| 2016/0193316 A1 | 7/2016 | Sette et al. |
| 2016/0251406 A1 | 9/2016 | Schlom et al. |
| 2017/0296639 A1 | 10/2017 | Ma et al. |
| 2018/0015114 A1 | 1/2018 | Vasievich et al. |
| 2018/0094032 A1 | 4/2018 | Bedu-Addo et al. |
| 2018/0221475 A1 | 8/2018 | Bedu-Addo et al. |
| 2018/0353599 A1 | 12/2018 | Bedu-Addo et al. |
| 2019/0004079 A1 | 1/2019 | Blom et al. |
| 2019/0105801 A1 | 4/2019 | Martinez et al. |
| 2019/0118300 A1 | 4/2019 | Penny et al. |
| 2019/0321321 A1 | 10/2019 | Bedu-Addo et al. |
| 2019/0358319 A1 | 11/2019 | Bedu-Addo et al. |
| 2023/0404907 A1 | 12/2023 | Haley et al. |

FOREIGN PATENT DOCUMENTS

| | | |
|---|---|---|
| CN | 101065350 A | 10/2007 |
| CN | 101193655 A | 6/2008 |
| CN | 100445794 C | 12/2008 |
| CN | 101702882 A | 5/2010 |
| CN | 102137675 A | 7/2011 |
| CN | 103091840 A | 5/2013 |
| CN | 103513411 A | 1/2014 |
| CN | 104189897 A | 12/2014 |
| CN | 104703588 A | 6/2015 |
| CN | 105101991 A | 11/2015 |
| CN | 105163753 A | 12/2015 |
| CN | 105223914 A | 1/2016 |
| CN | 105920599 A | 9/2016 |
| CN | 208705198 U | 4/2019 |
| CN | 111217918 A | 6/2020 |
| EP | 2167480 A2 | 3/2010 |
| JP | H06510051 A | 11/1994 |
| JP | H09502086 A | 3/1997 |
| JP | H10501822 A | 2/1998 |
| JP | 2002537102 A | 11/2002 |
| JP | 2002542341 A | 12/2002 |
| JP | 2003506095 A | 2/2003 |
| JP | 2003509035 A | 3/2003 |
| JP | 2004508012 A | 3/2004 |
| JP | 2006513979 A | 4/2006 |
| JP | 2006527762 A | 12/2006 |
| JP | 2007238559 A | 9/2007 |
| JP | 2008521757 A | 6/2008 |
| JP | 2010522206 A | 7/2010 |
| JP | 2010537961 A | 12/2010 |
| JP | 2011027782 A | 2/2011 |
| JP | 2011-518170 A | 6/2011 |
| JP | 2012526853 A | 11/2012 |
| JP | 2014527965 A | 10/2014 |
| JP | 2015-521601 A | 7/2015 |
| JP | 2015-530413 A | 10/2015 |
| JP | 6214889 B2 | 10/2017 |
| RU | 2311911 C2 | 12/2007 |
| TW | 200902060 A | 1/2009 |
| TW | 201000124 A | 1/2010 |
| TW | 201610629 A | 3/2016 |
| TW | I553436 B | 10/2016 |
| TW | I571633 B | 2/2017 |
| TW | I589298 B | 7/2017 |
| TW | 201732261 A | 9/2017 |
| TW | 1616736 B | 3/2018 |
| TW | 201813808 A | 4/2018 |
| WO | WO-9303709 A1 | 3/1993 |
| WO | WO-9303764 A1 | 3/1993 |
| WO | WO-9322338 A1 | 11/1993 |
| WO | WO-9504542 A1 | 2/1995 |
| WO | WO-9527508 A1 | 10/1995 |
| WO | WO-9703703 A1 | 2/1997 |
| WO | WO-0050006 A2 | 8/2000 |
| WO | WO-0062813 A2 | 10/2000 |
| WO | WO-0077043 A2 | 12/2000 |
| WO | WO-0111067 A1 | 2/2001 |
| WO | WO-0119408 A1 | 3/2001 |
| WO | WO 2001/57068 A1 | 8/2001 |
| WO | WO-0180900 A2 | 11/2001 |
| WO | WO-02069369 A2 | 9/2002 |
| WO | WO-02097116 A2 | 12/2002 |
| WO | WO 2003/003985 A2 | 1/2003 |
| WO | WO 03000398 A2 | 1/2003 |
| WO | WO-03011252 A1 | 2/2003 |
| WO | WO-03095641 A1 | 11/2003 |

(56) References Cited

FOREIGN PATENT DOCUMENTS

| WO | WO-2004014957 A1 | 2/2004 |
|---|---|---|
| WO | WO 2004089413 A1 | 10/2004 |
| WO | WO 2005000889 A1 | 1/2005 |
| WO | WO-2006063382 A1 | 6/2006 |
| WO | WO-2007022152 A2 | 2/2007 |
| WO | WO-2007121895 A2 | 11/2007 |
| WO | WO-2008116078 A2 | 9/2008 |
| WO | WO-2008148057 A2 | 12/2008 |
| WO | WO-2008116078 A4 | 10/2009 |
| WO | WO-2009129227 A1 | 10/2009 |
| WO | WO-2009142892 A1 | 11/2009 |
| WO | WO-2010101663 A2 | 9/2010 |
| WO | WO-2011004714 A1 | 1/2011 |
| WO | WO-2013016675 A1 | 1/2013 |
| WO | WO2013188627 A2 | 12/2013 |
| WO | WO2014047533 A1 | 3/2014 |
| WO | WO-2015061416 A2 | 4/2015 |
| WO | WO-2015176662 A1 | 11/2015 |
| WO | WO-2016133787 A1 | 8/2016 |
| WO | WO-2016146618 A1 | 9/2016 |
| WO | WO 2017/083820 A1 | 5/2017 |
| WO | 2021209545 A1 | 10/2021 |
| WO | 2023230620 A1 | 11/2023 |

OTHER PUBLICATIONS

L. Zitvogel et al., "Type I interferons in anticancer immunity", Nat. Rev. Immunol., 2015, vol. 15, pp. 405-414.

T. Decker et al., "The yin and yang of type I interferon activity in bacterial infection", Nat. Rev. Immunol., 2005, vol. 5, pp. 675-687.

MB Fuertes et al., "Host type I IFN signals are required for antitumor CD8$^+$ T cell responses through CD8$\alpha^+$ dendritic cells", J. Exp. Med, 2001, vol. 208, pp. 2005-2016.

International Preliminary Report on Patentability from counterpart International Application No. PCT/US2018/064060, issued Jun. 18, 2020.

Extended European Search Report from corresponding European Application No. 18886648.7 issued Aug. 11, 2021.

The First Office Action dated Dec. 29, 2021, of counterpart Chinese Application No. 201880088575.X, along with an English Translation.

European Patent Application No. 22151932.5 Search Report dated Oct. 26, 2022.

Lonez C., et al., "Cationic Lipids Activate Intracellular Signalling Pathways," Advanced Drug Delivery Reviews, 2012, 64(15), pp. 1749-1758.

Office Action for Chinese Patent Application No. 201811312211.3, mailed Aug. 30, 2022, 13 pages.

Office Action for Korean Patent Application No. 10 2019 7012979, mailed Oct. 25, 2022, 11 Pages.

Office Action for Taiwan Patent Application No. 107143751, mailed Aug. 1, 2022, 13 Pages.

Office Action from Brazilian Patent Application No. BR112019006831-7, dated Sep. 1, 2022, 5 pages.

Office Action from Brazilian Patent Application No. BR112020011265-8, dated Sep. 1, 2022, 5 pages.

Wang W., et al., "Classification of Human Leukocyte Antigen (HLA) Supertypes," Immunoinformatics, Methosds in Molecular Biology, 2014, vol. 1184, pp. 309-317.

"3,5,9-Trioxa-4-phosphaheptacos-18-en-1-aminium, 4-ethoxy-N, N, N-trimethyl-10-oxo-7-[[(9Z)- 1-oxo-9-octadecen-1-yl]oxy]-, 4-oxide, (7R, 18Z)-," Registry, Chemical Abstracts Service, Columbus, Ohio, US, Database Accession No. 183283-20-7, Nov. 22, 1996, 02 pages, XP002694550.

Alving C.R., "Design and Selection of Vaccine Adjuvants: Animal Models and Human Trials," Vaccine, Elsevier Science Ltd, 2002, vol. 20, pp. S56-S64.

Anderson P., "Effective Vaccination of Mice Against Mycobacterium Tuberculosis Infection With a Soluble Mixture of Secreted Mycobacterial Proteins," Infection and Immunity, American Society for Microbiology, Jun. 1994, vol. 62, No. 6, pp. 2536-2544.

Aramaki Y., et al., "Induction of Apoptosis in WEHI 231 Cells by Cationic Liposomes," Pharmaceutical Research, Plenum Publishing Corporation, Jan. 18, 2000, vol. 17, No. 5, pp. 515-520.

Baecher-Allan C., et al., "Immune Regulation in Tumor-Bearing Hosts," Current Opinion in Immunology, Elsevier Limited, 2006, vol. 18, pp. 214-219.

Baecher-Allan C., et al., "Suppressor T Cells in Human Diseases," Journal of Experimental Medicine, The Rockefeller University Press, Aug. 2, 2004, vol. 200, No. 3, pp. 273-276.

Banchereau J., et al., "Dendritic Cells and the Control of Immunity," Nature, Mar. 19, 1998, vol. 392, No. 6673, pp. 245-252.

Bei R., et al., "The Use of a Cationic Liposome Formulation (DOTAP) Mixed with a Recombinant Tumor-Associated Antigen to Induce Immune Responses and Protective Immunity in Mice," Journal of Immunotherapy, 1998, vol. 21, No. 3, 2 Pages, Abstract only.

Bei R., et al., "The Use of a Cationic Liposome Formulation (DOTAP) Mixed With a Recombinant Tumor-associated Antigen to Induce Immune Responses and Protective Immunity in Mice," Journal Of Immunotherapy, Lippincott Williams & Wilkins, Hagerstown, MD, US, Jan. 1, 1998, vol. 21, No. 3, pp. 159-169, ISSN 1524-9557, XP002963675.

Benmohamed L., et al., Lipopetide Immunization Without Adjuvant Induces Potent and Long-Lasting B, T Helper, and Cytotoxic T Lymphocyte Resonses Against a Malaria Liver Stage Antigen in Mice and Chimpanzees, European Journal of Immunology, VCH Verlagsgesellschaft, 1997, vol. 27, pp. 1242-1253.

Berraondo P., et al., "Eradication of Large Tumors in Mice by a Tritherapy Targeting the Innate, Adaptive, and Regulatory Components of the Immune System," Cancer Research, American Association for Cancer Research, US, Sep. 15, 2007, vol. 67, No. 18, pp. 8847-8855, DOI:10.1158/0008-5472.CAN-07-0321, ISSN 0008-5472, XP002673813.

Black M., et al., "Advances in the Design and Delivery of Peptide Subunit Vaccines With a Focus on Toll-like Receptor Agonists." Expert Rev. Vaccines, vol. 9, No. 2, 2010, pp. 157-173.

Brunel F., et al., "Cationic Lipid DC-Chol Induces an Improved and Balanced Immunity Able to Overcome the Unresponsiveness to the Hepatitis B Vaccine," Vaccine, Apr. 1999, vol. 17, pp. 2192-2203.

Brunette E., et al., "Lipofection Does Not Require the Removal of Serum," Nucleic Acids Research, Cancer Research Institute, University of California San Francisco Medical Center, San Francisco, California, Dec. 26, 1991, vol. 20, No. 5, p. 1151.

Byers A.M., et al., "Cutting Edge: Rapid In Vivo CTL Activity by Polyoma Virus-Specific Effector and Memory CD8+ T Cells," The American Association of Immunologists Inc., The Journal of Immunology, 2003, vol. 171, pp. 17-21.

Cantor H., et al., "Immunoregulatory Circuits Among T-Cell Sets II. Physiologic Role of Feedback Inhibition in Vivo: Absence in NZB Mice," The Rockefeller University Press, Journal of Experimental Medicine, 1978, pp. 1116-1125.

Carr M.W., et al., "Monocyte Chemoattractant Protein 1 Acts as AT-Lymphocyte Chemoattractant," Proceedings of The National Academy of Sciences of The United States of America, Committee on Immunology and Department of Pathology, Harvard Medical School, Department of Cardiology, Childen's Hospital, and The Center for Blood Research, Boston, Massachusetts, Apr. 1994, vol. 91, pp. 3652-3656.

Castellino F., et al., "Chemokine-Guided CD4+ T Cell Help Enhances Generation of IL-6Ra high IL-7Ra high Prememory COB+ T Cells," The Journal of Immunology, Lymphocyte Biology Section, Laboratory of Immunology, National Institute of Allergy and Infectious Diseases, National Institutes of Health, Bethesda, Maryland, 2007, vol. 178, pp. 778-787.

Castellino F., et al., "Chemokines Enhance Immunity by Guiding Naive COB+ T Cells to Sites of CD4+ T Cell-Dendritic Cell Interaction," Nature, Lymphocyte Biology Section, Laboratory of Immunology, National Institute of Allergy and Infectious Diseases, National Institutes of Health, Bethesda, Maryland, Apr. 13, 2006, vol. 440, pp. 890-895.

(56) References Cited

OTHER PUBLICATIONS

Chen W., et al., "A Simple and Effective Cancer Vaccine Consisting of an Antigen and a Cationic Lipid," Division of Molecular Pharmaceutics, School of Pharmacy, University of North Carolina, Chapel Hill, Chapel Hill, North Carolina, USA, 2008, pp. 1-48.

Chen W., et al., "A Simple But Effective Cancer Vaccine Consisting of an Antigen and a Cationic Lipid," Cancer Immunology, Immunotherapy, Springer, Berlin, DE, Aug. 28, 2007, vol. 57, No. 4, pp. 517-530, ISSN 1432-0851, XP019586704.

Chen W., et al., "Induction of Cytotoxic T-Lymphocytes and Antitumor Activity by a Liposomal Lipopeptide Vaccine," Molecular Pharmaceutics, 2008, vol. 5, No. 3, pp. 464-471.

Chen W.C., et al., "Cationic Liposome-Based Peptide Vaccine: Potent Therapeutics for Cervical Cancer," Poster, School of Pharmacy, May 20, 2006, 1 Page.

Chikh G., et al., "Liposomal Delivery of CTL Epitopes to Dendritic Cells, Bioscience Reports," Plenum Publishing Corporation, Apr. 2002, vol. 22, No. 2, pp. 339-353.

Christensen D., et al., "Cationic Liposomes as Vaccine Adjuvants," Expert Review of Vaccines, Oct. 2007, vol. 6, No. 5, pp. 785-796, XP008137314.

Cohen P.A., et al., "CD4+ T-Cells From Mice Immunized to Syngeneic Sarcomas Recognize Distinct, Non- Shared Tumor Antigens," Cancer Research, Branches of Surgery and Dermatology, National Cancer Institute, National Institute of Health, Bethesda, Maryland, Feb. 15, 1994, vol. 54, pp. 1055-1058.

Comes A., et al., "CD25+ Regulatory T Cell Depletion Augments Immunotherapy of MicroMetastases by an IL-21-Secreting Cellular Vaccine1," The Journal of Immunology, The American Association of Immunologists Incorporated, 2006, pp. 1750-1758.

Communication about Intention to Grant a European Patent received for European Application No. 08799629.4, mailed on Jun. 1, 2015, 6 Pages.

Communication about Intention to Grant a European Patent Received for European Application No. 09733034.4, mailed on Jul. 6, 2018, 6 Pages.

Communication about Intention to Grant a European Patent Received for European Application No. 12831495.2, mailed on Feb. 16, 2018, 10 Pages.

Communication about Intention to Grant a European Patent Received for European Application No. 13804165.2, mailed on May 9, 2019, 7 Pages.

Connor J., et al., "pH-Sensitive Immunoliposomes as an Efficient and Target-Specific Carrier for Antitumor Drugs," Cancer Research, Department of Biochemistry, University of Tennessee, KnoxvilleTennessee, Jul. 1986, vol. 46, pp. 3431-3435.

Copland M.J., et al., "Lipid Based Particulate Formulations for the Delivery of Antigen," Immunology and Cell Biology, Australasian Society for Immunology Incorporate, 2005, vol. 83, pp. 97-105. Credo Reference, 2005.

Cui Z., et al., "Coating of Mannan on LPD Particles Containing HPV E7 Peptide Significantly Enhances Immunity Against HPV-Positive Tumor," Pharmaceutical Research, Jun. 2004, vol. 21, No. 6, pp. 1018-1025.

Cui Z., et al., "Immunostimulation Mechanism of LPD Nanoparticle as a Vaccine Carrier," Molecular Pharmaceutics, American Chemical Society, 2005, vol. 2, No. 1, pp. 22-28.

Cui Z., et al., "Liposome-Polycation-DNA (LPD) Particle as a Carrier and Adjuvant for Protein-Based Vaccines: Therapeutic Effect Against Cervical Cancer," Cancer Immunology and Immunother, Springer-Verlag, 2005, vol. 54, pp. 1180-1190.

Datta G., et al., "Effects of Increasing Hydrophobicity on the Physical-Chemical and Biological Properties of a Class A Amphipathic Helical Peptide," Journal of Lioid Research, 2001, vol. 42, pp. 1096-1104.

Davies G., "Adjuvant Activity of Cytokines," Chapter 19, Methods in Molecular Biology, 2010, ISSN: 0003658713, pp. 287-309.

De Bruijn M.L.H., et al., "Immunization With Human Papillomavirus Type 16 (Hpv16) Oncoproteinoloaded Dendritic Cells as Well as Proteinin Adjuvant Induces Mhc Class 1-restricted Protection to Hpv16-induced Tumor Cells," Cancer Research, Feb. 15, 1998, vol. 58, No. 4, pp. 724-731.

Decision of Rejection from Corresponding Japanese Patent Application No. JP2018524752, dated Jul. 13, 2021, 6 Pages.

Decision on the Request for Reexamination from Corresponding Chinese Application No. 200880017151.0, dated Jun. 12, 2017, 18 pages.

Decision to Grant a European Patent received for European Application No. 08799629.4, mailed on Oct. 15, 2015, 3 Pages.

Decision to Grant a European Patent received for European Application No. 09733034.4, mailed on Oct. 25, 2018, 2 Pages.

Decision to Grant a European Patent Received for European Application No. 12831495.2, mailed on Jun. 7, 2018, 2 Pages.

Decision to Grant a European Patent received for European Application No. 13804165.2, mailed on Sep. 19, 2019, 3 Pages.

Denning D.W., et al., "Micafungin (FK463), Alone or in Combination with Other Systemic Antifungal Agents, for the Treatment of Acute Invasive Aspergillosis," Journal of Infection, Elsevier Ltd, 2006, vol. 53, pp. 337-349.

Desilva D.R, et al., "The p38 Mitogen-Activated Protein Kinase Pathway in Activated and Anergic Th1 Cells," Cellular Immunology, Academic Press, 1997, vol. 180, pp. 116-123.

Diamond D.J., et al., "Development of a Candidate HLA A*0201 Restricted Peptide-Based Vaccine Against Human Cytomegalovirus Infection," Blood, Sep. 1, 1997, vol. 90, No. 05, pp. 1751-1767.

Dileo J., et al., "Lipid-Protamine-DNA-Mediated Antigen Delivery to Antigen-Presenting Cells Results in Enhanced Anti-Tumor Immune Responses," The American Society of Gene Therapy, Molecular Therapy, May 2003, vol. 7, No. 5, pp. 640-648.

Dillon S., et al., "A Toll-Like Receptor 2 Ligand Stimulates Th2 Responses In Vivo, via Induction of Extracellular Signal-Regulated Kinase Mitogen-Activated Protein Kinase and c-Fos in Dendritic Cells," The Journal of Immunology, The American Association of Immunologists, Inc., 2004, vol. 172, 12 Pages.

Dolcetti L., et al., "Hierarchy of Immunosuppressive Strength Among Myeloid-derived Suppressor Cell Subsets is determined by GM-CSF," European Journal of Immunology, 2010, vol. 40, pp. 22-35.

Dong C., et al., "MAP Kinases in the Immune Response," Annual Review of Immunology, Annual Reviews, 2002, vol. 20, pp. 55-72.

Dow S.W., et al., "Lipid-DNA Complexes Induce Potent Activation of Innate Immune Responses and Antitumor Activity When Administered Intravenously," The Journal of Immunology, 1999, vol. 163, pp. 1552-1561.

Dranoff G., "GM-CSF-Based Cancer vaccines," Immunological Reviews, 2002, vol. 188, pp. 147-154.

Dupuis M., et al., "Dendritic Cells Internalize Vaccine Adjuvant After Intramuscular Injection," Cellular Immunology, Academic Press, 1998, vol. 186, pp. 18-27.

Eardley D.D., et al., "Immunoregulatory Circuits Among T-Cell Sets I. T-Helper Cells Induce Other T-Cell Sets to Exert Feedback Inhibition," The Rockefeller University Press, Journal of Experimental Medicine, 1978, pp. 1106-1115.

EMBL Database Entry GG774706, Bacteroides sp. 1_ 1_ 14 Genomic Scaffold Supercont1.5, Jun. 15, 2010, 202 Pages, [Retrieved on Oct. 28, 2013), Retrieved from the Internet: http://www.ebi.ac.uk/ena/data/view/GG774706&display=text.

English Translation of Chinese First Office Action of Corresponding Chinese Application No. 201380060902.8, dated May 26, 2016, 12 Pages.

English Translation of First Office Action from Corresponding Chinese Application No. 201710819740.1, dated Jul. 17, 2020, 21 Pages.

English Translation of Fist Office Action from Corresponding Chinese Patent Application No. 201710819740.1, dated Apr. 29, 2021, 15 Pages.

English Translation of Notice of Reasons for Refusal Received in Corresponding Japanese Patent Application No. 2018-524752 dated Sep. 3, 2020, 8 Pages.

English Translation of Notification of Defects from Corresponding Israel Application No. 259294, dated May 5, 2021, 6 Pages.

(56) References Cited

OTHER PUBLICATIONS

English translation of Notification of Reasons for Rejection from Corresponding Japanese Application No. 2014-17712, mailed Sep. 15, 2015, 11 Pages.
English Translation of Office Action from Corresponding Taiwan Application No. 102134251, dated Apr. 24, 2017, 13 Pages.
English Translation of Office Action in Taiwanese Application No. 101133392, mailed Nov. 2, 2015, 16 pages.
English Translation of Office Action Japanese Application No. JP2014529976, mailed Jul. 11, 2017, 07 pages.
English Translation of Taiwanese Office Action for Corresponding Taiwanese Application No. 102121266, dated Jun. 20, 2016, 8 Pages.
English Translation of Third Chinese Office Action from Corresponding Chinese Application No. 201380060902.8, dated Oct. 18, 2017, 27 Pages.
English Translation of Third Office Action from Corresponding Chinese Application No. 200980121761.X, dated May 9, 2016, 10 Pages.
European Communication Corresponding European Application No. EP12831495.2 dated Jun. 6, 2016, 5 pages.
European Search Report and Written Opinion prepared for EP12831495 completed on Mar. 5, 2015, 8 Pages.
Examination Report No. 1 for Corresponding Australian Application No. 2013317805, mailed Jul. 11, 2017, 4 Pages.
Examination Report No. 2 from Corresponding Australian Patent Application No. 2017340407, dated Jan. 6, 2021, 5 Pages.
Extended European Search Report for European Application No. 13804165.2, mailed Jan. 5, 2016, 5 Pages.
Extended European Search Report for European Application No. 13839199.0, mailed Apr. 4, 2016, 7 Pages.
Extended European Search Report for European Application No. 16865201.4, mailed Jun. 6, 2019, 10 Pages.
Extended European Search Report for European Application No. 17859111.1, mailed May 26, 2020, 7 Pages.
Extended European Search Report for European Application No. 19203293.6, mailed Mar. 10, 2020, 6 Pages.
Extended European Search Report for European Application No. 08799629.4, mailed Mar. 5, 2010, 04 Pages.
Extended European Search Report for European Application No. 09733034.4, mailed Apr. 15, 2013, 07 Pages.
Extended European Search Report for European Application No. 12831495.2, mailed Mar. 16, 2015, 09 Pages.
Felnerova D., et al., "Liposomes and Virosomes as Delivery Systems for Antigens," Nucleic Acids and Drugs, Current Opinion in Biotechnology, Elsevier Ltd, 2004, vol. 15, pp. 518-529.
Feltkamp M.C., et al., "Vaccination with Cytotoxic T Lymphocyte Epitope-containing Peptide Protects Against a Tumor Induced by Human Papillomavirus Type 16-transformed Cells," European Journal of Immunology, PubMed, Sep. 1993, vol. 23, No. 9, pp. 2242-2249.
Fernandes I., et al., "Synthetic Lipopeptides Incorporated in Liposomes: In Vitro Stimulation of the Proliferation of Murine Splenocytes and In Vivo Induction of an Immune Response Against a Peptide Antigen," Molecular Immunology, Elsevier Limited, 1997, vol. 34, No. 8/9, pp. 569-576.
Filion M.C., et al., "Anti-Inflammatory Activity of Cationic Lipids," British Journal Of Pharmacology, Oct. 1997, vol. 122, No. 3, pp. 551-557, ISSN 0007-1188, XP002569679.
Filion M.C., "Major Limitations in the Use of Cationic Liposomes for DNA Delivery," International Journal of Pharmaceutics, 1998, vol. 162, No. 1-2, pp. 159-170.
Final Office Action from Corresponding U.S. Appl. No. 15/775,680, dated Jan. 22, 2021, 9 Pages.
First Examination Report from Corresponding Indian Patent Application No. 201618020440, dated Nov. 10, 2020, 4 Pages.
First Examination Report from counterpart Indian Application No. 11144/DELNP/2014 dated Mar. 7, 2019, 6 pages.
First Office Action from Corresponding Chinese Patent Application No. 201811312211.3, dated Aug. 3, 2021, 27 Pages.
Gabrilovich D.I., et al., "Myeloid-Derived-Suppressor Cells as Regulators of the Immune System," Nat. Rev. Immunol, Mar. 2009, vol. 9, No. 3, pp. 162-174.
Gahery-Segard H., et al., "Multiepitopic B-and T-Cell Responses Induced in Humans by a Human Immunodeficiency Virus Type 1 Lipopeptide Vaccine," American Society for Microbiology, Journal of Virology, Feb. 2000, vol. 74, No. 4, pp. 1694-1703.
Gandhapudi S.K., et al., "Antigen Priming With Enantiospecific Cationic Lipid Nanoparticles Induces Potent Antitumor CTL Responses Through Novel Induction of a Type I IFN Response," Journal of Immunology, May 3, 2019, vol. 202, pp. 3524-3536, Retrieved from URL: http://www.jimmunol.org/contenU202/12/3524.
Glick D., "Methods of Biochemical Analysis," Cancer Biology Research Laboratory, Stanford University Medical Center, Stanford, California, 1988, vol. 33, pp. 337-462.
Gluck R., et al., "Biophysical Validation of Epaxal Berna, a Hepatitis A Vaccine Adjuvanted with Immunopotentiating Reconstituted Influenza Virosomes (IRIV)," Developments in Biologicals, 2000, vol. 103, 12 Pages.
Gold J.S., et al. "A Single Heteroclitic Epitope Determines Cancer Immunity After Xenogeneic Dna Immunization Against a Tumor Differentiation Antigen," The Journal of Immunology, 2003, 170. 10, pp. 5188-5194.
Grabowska et al., "Identification of Promiscuous Hpv16-Derived T Helper Cell Epitopes for Therapeutic Hpv Vaccine Design," International Journal of Cancer, 2015, vol. 136, No. 1, pp. 212-224, XP055497833.
Greenfield I., et al., "Human Papillomavirus 16 E7 Protein is Associated with the Nuclear Matrix," Proceedings of the National Academy of Sciences of the United States of America, Dec. 1991, vol. 88, pp. 11217-11221.
Gregoriadis G., et al., "Vaccine Entrapment in Liposomes," Methods, 1999, vol. 19, pp. 156-162.
Gregoriadis G., "Immunological Adjuvants: a Role for Liposomes," Immunology Today, The School of Pharmacy, University of London, 1990, vol. 11, No. 3, pp. 89-97.
Hamley I.W., "Self-Assembly of Amphiphilic Peptides," Soft Matter, 2011, vol. 7, pp. 4122-4138.
Hartikka J., et al., "Vaxfectin (Registered), a Cationic Lipid-based Adjuvant for Protein- based Influenza Vaccines," 2009, Vaccine, vol. 27, pp. 6399-6403.
Hasegawa A., et al., "Nasal Immunization With Diphtheria Toxoid Conjugated-CD52 Core Peptide Induced Specific Antibody Production in Genital Tract of Female Mice," American Journal of Reproductive Immunology, 2002, vol. 48, pp. 305-311.
Hassan C., et al., "Naturally Processed Non-Canonical HLA-A*02:01 Presented Peptides," The Journal of Biological Chemistry, 2015, vol. 290, No. 5, pp. 2593-2603, XP055497822.
Helmby H., et al., "Interleukin-1 Plays a Major Role in the Development of Th2-Mediated Immunity," European Journal of Immunology, WHILEY-VCH Verlag Gmbh & Co., 2004, vol. 34, pp. 3674-3681.
Holten-Anderson L., et al., "Combination of the Cationic Surfactant Dimethyl Dioctadecyl Ammonium Bromide and Synthetic Mycobacterial Cord Factor as an Efficient Adjuvant for Tuberculosis Subunit Vaccines," Infection and Immunity, Mar. 2004, vol. 72, No. 3, pp. 1608-1617.
Hultner L., "In Activated Mast Cells, IL-1 Up-Regulates the Production of Several Th2-Related Cytokines Including IL-9," The American Association of Immunologists, The Journal of Immunology, 2000, vol. 164, pp. 5556-5563.
Immordino et al., "Stealth Liposomes: Review of the Basic Science, Rationale, and Clinical Applications, Existing and Potential," International Journal of Nanomedicine, 2006, vol. 1, No. 03, pp. 297-315.
Inaba K., et al., "Generation of Large Numbers of Dendritic Cells From Mouse Bone Marrow Cultures Supplemented With Granulocyte/Macrophage Colony-Stimulating Factor," Journal of Experimental Medicine, The Rockefeller University Press, Dec. 1992, vol. 176, pp. 1693-1702.
International Preliminary Report on Patentability for International Application No. PCT/US2009/040500, mailed Oct. 28, 2010, 6 Pages.

(56) References Cited

OTHER PUBLICATIONS

International Preliminary Report on Patentability for International Application No. PCT/US2013/045578, mailed Dec. 24, 2014, 7 Pages.
International Preliminary Report on Patentability for International Application No. PCT/US2013/061132, mailed Apr. 2, 2015, 10 Pages.
International Preliminary Report on Patentability for International Application No. PCT/US2017/055119, mailed Apr. 18, 2019, 16 Pages.
International Search Report and Written Opinion for International Application No. PCT/US2009/040500, mailed Jun. 4, 2009, 7 Pages.
International Search Report and Written Opinion for International Application No. PCT/US2013/045578, mailed Nov. 25, 2013, 9 Pages.
International Search Report and Written Opinion for International Application No. PCT/US2013/061132, mailed Dec. 30, 2013, 12 Pages.
International Search Report and Written Opinion for International Application No. PCT/US2017/055119, mailed Mar. 7, 2018, 23 Pages.
International Search Report and Written Opinion for International Application No. PCT/US2021/060337, mailed Feb. 14, 2022, 7 Pages.
International Preliminary Report on Patentability for International Application No. PCT/US2008/057678, mailed Sep. 22, 2009, 5 Pages.
International Preliminary Report on Patentability for International Application No. PCT/US2012/054786, mailed Mar. 20, 2014, 6 Pages.
International Preliminary Report on Patentability for International Application No. PCT/US2016/061829, mailed May 24, 2018, 15 Pages.
International Preliminary Report on Patentability for International Application No. PCT/US2017/055348, mailed Apr. 18, 2019, 6 Pages.
International Search Report and Written Opinion for International Application No. PCT/US2008/057678, mailed Apr. 20, 2009, 6 Pages.
International Search Report and Written Opinion for International Application No. PCT/US2012/054786, mailed Nov. 15, 2012, 8 Pages.
International Search Report and Written Opinion for International Application No. PCT/US2016/061829, mailed Feb. 24, 2017, 18 Pages.
International Search Report and Written Opinion for International Application No. PCT/US2017/055348, mailed Jan. 5, 2018, 8 Pages.
International Search Report for International Application No. PCT/US2008/057678, mailed Apr. 20, 2009, 3 Pages.
International Search Report for International Application No. PCT/US2009/040500, mailed Jun. 4, 2009, 2 Pages.
Ishida T., et al., "Defective Function of Langerhans Cells in Tumor-Bearing Animals is the Result of Defective Maturation from Hemopoietic Progenitors," The American Association of Immunologists, The Journal of Immunology, 1998, vol. 161, pp. 4842-4851.
Iwaoka S., et al., "Cationic Liposomes Induce Apoptosis Through p38 MAP-kinase-caspase-8-Bid Pathway in Macrophage-like RAW 264.7 Cells", Journal of Leukocyte Biology, Jan. 2006, vol. 79, pp. 184-191, XP008117765.
Jacob A., et al., "Convergence of Signaling Pathways on the Activation of ERK in B Cells," The Journal of Biological Chemistry, The American Society for Biochemistry and Molecular Biology Incorporated, Jun. 28, 2002, vol. 277, No. 26, pp. 23420-23426.
Jiao X., et al., "Modulation of Cellular Immune Response Against Hepatitis C Virus Nonstructural Protein 3 by Cationic Liposome Encapsulated DNA Immunization," Hepatology, Feb. 2003, vol. 37, No. 2, pp. 452-460.

Jisho: "Kojien," Japanese Dictionary, Third Edition, Iwanami Shoten, 1983, 1 Page.
Johnson G.L., et al., "Mitogen-activated Protein Kinase Pathways Mediated by ERK, JNK, and p38 Protein Kinases," Science, Dec. 6, 2002, vol. 298, pp. 1911-1912.
Jones C.A., et al., "Vaccination Strategies to Prevent Genital Herpes and Neonatal Herpes Simplex Virus (HSV) Disease," HERPES, 2004, vol. 11, pp. 12-17.
Joseph A., et al., "A New Intranasal Influenza Vaccine Based on a Novel Polycationic Lipid-Ceramide Carbamoyl-Spermine (CCS) I. Immunogenicity and Efficacy Studies in Mice," Vaccine, 2006, vol. 24, pp. 3990-4006.
Kabarowski J.H.S., et al., "Lysophosphatidylcholine as a Ligand for the Immunoregulatory Receptor G2A," Science, Department of Microbiology, Immunology, and Molecular Genetics, Department of Cancer Biology, Lerner Research Institute, Cleveland, Ohio, Jul. 27, 2001, vol. 293, 06 pages.
Kahn J.O., et al., "Clinical and Immunologic Responses to Human Immunodeficiency Virus (HIV) Type 1SF2 GP120 Subunit Vaccine Combined with MF59 Adjuvant with or without Muramyl Tripeptide Dipalmitoyl Phosphatidylethanolamine in Non-HIV-Infected Human Volunteers," The Journal of Infectious Diseases, 1994, vol. 170, pp. 1288-1291.
Kanafani Z.A., et al., "Daptomycin: a Rapidly Bactericidal Lipopeptide for the Treatment of Gram-Positive Infections," Experimental Review of Antibacterial Infections, Future Drugs Ltd, 2007, vol. 5, No. 2, pp. 177-184.
Kantengwa S., et al., "Superoxide Anions Induce the Maturation of Human Dendritic Cells," American Journal of Respiratory and Critical Care Medicine, Divisions of Pneumology and Thoracic Surgery, University Hospital, Geneva, Switzerland, Feb. 1, 2003, vol. 167, No. 3, pp. 431-437.
Kenter G.G., et al., "Vaccination Against Hpv-16 Oncoproteins for Vulvar Intraepithelial Neoplasia," The New England Journal of Medicine, Nov. 5, 2009, vol. 361, pp. 1838-1847.
Kim J.J., et al., "CD8 Positive T Cells Influence Antigen-Specific Immune Responses through the expression of Chemokines," Journal of Clinical Investigation, The American Society for Clinical Investigation, Inc., Sep. 1998, vol. 102, No. 6, pp. 1112-1124.
Kogkopoulou O., et al., "Conditional Up-Regulation of IL-2 Production by p38 MAPK Inactivation Is Mediated by Increased ERKI/2 Activity," Journal of Leukocyte Biology, May 2006, vol. 79, pp. 1052-1060.
Kokkoli E., et al., "Self-assembly and Applications of Biomimetic and Bioactive Peptide-amphiphiles," Soft Matter, 2006, vol. 2, pp. 1015-1024.
Korsholm, "Unravelling the Adjuvant Mechanism of Cationic Liposomes," Statens Serum Institute, Jun. 2006, pp. 15.00-15.30.
Korsholm K.S., et al., "The Adjuvant Mechanism of Dimethyldioctadecyl-ammonium Liposomes," Immunology, Jun. 2007, vol. 121, No. 2, pp. 216-226.
Li S., et al., "Targeted Delivery of Antisense Oligodeoxynucleotide and Small Interference RNA Into Lung Cancer Cells," Molecular Pharmaceutics, American Chemical Society, 2006, vol. 3, No. 5, pp. 579-588.
Liang M.T., et al., "Encapsulation of Lipopeptides Within Liposomes: Effect of Number of Lipid Chains, Chain Length and Method of Liposome Preparation," International Journal of Pharmaceutics, Elsevier B.V., 2005, vol. 301, pp. 247-254.
Lodoen M.B., et al., "Natural Killer Cells as an Initial Defense Against Pathogens," Current Opinion in Immunology, Elsevier Ltd, 2006, vol. 18, pp. 391-398.
Lonez C., et al., "Cationic Liposomal Lipids: From Gene Carriers to Cell Signaling," Progress in Lipid Research, 2008, vol. 47, pp. 340-347.
Lucas W., et al., "Viral Capsids and Envelopes: Structure and Function," Encyclopedia of Life Sciences (ELS), John Wiley & Sons, 2010, pp. 1-7.
Mackay C.R., "Chemokines: Immunology's High Impact Factors," Nature Immunology, Feb. 2001, vol. 2, No. 2, pp. 95-101.

(56) References Cited

OTHER PUBLICATIONS

Mansour M., et al., "Therapy of Established B16-f10 Melanoma Tumors by a Single Vaccination of Ctl/t Helper Peptides in Vaccimax," Journal of Translational Medicine, 2007, vol. 5, No. 20, 8 Pages.
Melief C.J.M., et al., "Effective Therapeutic Anticancer Vaccines Based on Precision Guiding of Cytolytic T Lymphocytes," Blackwell Munksgaard, Immunological Reviews, 2002, vol. 188, pp. 177-182.
Minutello M., et al., "Safety and Immunogenicity of an Inactivated Subunit Influenza Virus Vaccine Combined With MF59 Adjuvant Emulsion in Elderly Subjects," Immunized for Three Consecutive Influenza Seasons, Vaccine, Elsevier Science Limited, 1999, vol. 17, pp. 99-104.
Moingeon P., et al., "Towards the Rational Design of Th1 Adjuvants," Vaccine, Elsevier Science Limited, 2001, vol. 19, pp. 4363-4372.
Non Final Office Action for Counterpart mailed Mar. 5, 2020 for U.S. Appl. No. 16/532,728, 12 Pages.
Non Final Office Action mailed Apr. 29, 2022 for U.S. Appl. No. 14/531,469, 12 Pages.
Non-Final Office Action from Counterpart U.S. Appl. No. 15/775,680, mailed Apr. 1, 2020, 14 Pages.
Notification of Reason of Rejection of Japanese Application No. JP2017218514, mailed Aug. 21, 2018, 13 pages.
Office Action for Canadian Application No. 2885741, dated May 10, 2022, 03 pages.
Office Action for Corresponding Russian Application No. 2015101110, with its English translation, dated Aug. 8, 2017, 06 pages.
Office Action for Corresponding Russian Application No. 2015101110, with its English translation, dated Mar. 28, 2017, 10 pages.
Office Action for European Application No. 08799629.4, mailed Aug. 7, 2012, 4 Pages.
Office Action for European Application No. 08799629.4, mailed Jan. 10, 2014, 3 Pages.
Office Action for European Application No. 08799629.4, mailed May 17, 2010, 1 Page.
Office Action for European Application No. 08799629.4, mailed Apr. 26, 2011, 3 Pages.
Office Action for European Application No. 09733034.4, mailed Apr. 16, 2015, 5 Pages.
Office Action for European Application No. 09733034.4, mailed Nov. 18, 2016, 4 Pages.
Office Action for European Application No. 12831495.2, mailed Dec. 1, 2016, 4 Pages.
Office Action for European Application No. 12831495.2, mailed Jun. 6, 2016, 5 Pages.
Office Action for European Application No. 12831495.2, mailed May 11, 2017, 4 Pages.
Office Action for European Application No. 13804165.2, mailed Mar. 2, 2018, 3 Pages.
Office Action for European Application No. 13804165.2, mailed Jul. 5, 2017, 4 Pages.
Office Action for European Application No. 13804165.2, mailed May 17, 2018, 3 Pages.
Office Action for European Application No. 13804165.2, mailed Sep. 22, 2016, 3 Pages.
Office Action for European Application No. 13804165.2, mailed Aug. 23, 2018, 3 Pages.
Office Action for European Application No. 13839199.0, mailed Nov. 13, 2017, 4 Pages.
Office Action for European Application No. 13839199.0, mailed Nov. 21, 2016, 4 Pages.
Office Action for European Application No. 13839199.0, mailed Jul. 30, 2018, 4 Pages.
Office Action for European Application No. 16865201.4, mailed on Jul. 16, 2020, 5 Pages.
Office Action for European Application No. 19203293.6, mailed Feb. 19, 2021,4 Pages.
Office Action for European Application No. 19203293.6, mailed Dec. 22, 2021, 4 Pages.
Office Action for Taiwanese Application No. TW101133392, with English Translation, mailed Jul. 17, 2017, 05 pages.
Office Action from Corresponding Indian Application No. 7544/DELNP/2010, dated Jun. 22, 2017, 10 Pages.
Office Action from Counterpart Brazilian Patent Application. No. PI0910464-0, dated Nov. 6, 2018, and a Brief Summary in English, 5 pages.
Office Action from Counterpart Taiwanese Patent Application. No. 106109798 with English translation, dated Nov. 14, 2017, 09 pages.
Office Action of European Application No. 12831495.2, mailed Nov. 17, 2015, 5 pages.
Office Action of Taiwanese Application No. 101133392, dated May 16, 2016, along with an English translation of the Search Report, 8 pages.
Okada N., et al., "Effects of Lipofectin-Antigen Complexes on Major Histocompatibility Complex Class I-Restricted Antigen Presentation Pathway in Murine Dendritic Cells and on Dendritic Cell Maturation," Biochimica et Biophysica Acta, Elsevier Science, 2001, vol. 1527, pp. 97-101.
Oliveira L.M.F.D., et al., "Design of Immune Responses and Anti-Tumor Potential of an HPV16 E6E7 Multi-Epitope Vaccine," PLoS ONE, 2015, vol. 10, No. 9: e0138686, 13 Pages.
Padron-Regalado E., "Vaccine for SARS-CoV-2: Lessons from Other Coronavirus Strains," Infectious Diseases and Therapeutics, 2020, vol. 9, pp. 255-274.
Perales M., et al., "Phase I/II Study of GM-CSF DNA as an Adjuvant for a Multipeptide Cancer Vaccine in Patients with Advanced Melanoma," Molecular Therapy, Dec. 2008, vol. 16, No. 12, pp. 2022-2029.
Pialoux G.D., et al., "Lipopeptides Induce Cell-Mediated Anti-HIV Immune Responses in Seronegative Volunteers," Lippincott Williams & Wilkins, Inc., Official Journal of the International of AIDS, Jul. 6, 2001, vol. 15, No. 10, pp. 1239-1249.
Pierre Y., et al., "Liposome-Mediated DNA Immunisation via the Subcutaneous Route," Journal of Drug Targeting, Taylor & Francis Ltd, 2003, vol. 11, No. 8-10, pp. 555-563.
Radu C.G., et al., "T Cell Chemotaxis to Lysophosphatidylcholine through the G2A Receptor," Proceedings of the National Academy of Sciences, The National Academy of Sciences of The USA, Jan. 6, 2004, vol. 101, No. 1, pp. 245-250.
Rao P.E., et al., "Differentiation and Expansion of T Cells with Regulatory Function from Human Peripheral Lymphocytes by Stimulation in the Presence of TGF-B," The Journal of Immunology, The American Association of Immunologists, Inc., 2005, vol. 174, pp. 1446-1455.
Restriction Requirement from Counterpart dated Jan. 7, 2020 for U.S. Appl. No. 15/775,680, 09 Pages.
Riemer A.B., et al., "A Conserved E7-Derived Cytotoxic T Lymphocyte Epitope Expressed on Human Papillomavirus-16 Transformed HLA-A2+ Human Epithelial Cancers," The Journal of Biological Chemistry, Sep. 17, 2010, vol. 285, No. 38, pp. 29608-29622, XP055207597.
Robinson J.H., et al., "Palmitic Acid Conjugation of a Protein Antigen Enhances Major Histocompatibility Complex Class II-Restricted Presentation to T Cells," Immunology, 1992, vol. 76, pp. 593-598.
Rock K.L., et al., "Natural Endogenous Adjuvants," Spriner Semin Immunology, 26, 2005, pp. 231-246.
Ross T.M., "A Trivalent Virus-like Particle Vaccine Elicits Protective Immune Responses against Seasonal Influenza Strains in Mice and Ferrets," PloS one, e6032, Jun. 24, 2009, vol. 4, No. 6, pp. 1-11.
Rughetti A., et al., "Transfected Human Dendritic Cells to Induce Antitumor Immunity," Gene Therapy, Sep. 2000, vol. 7. No. 17, pp. 1458-1466.
Santin A.D., et al., "Induction of Human Papillomavirus-Specific CD4+ and CDS+ Lymphocytes by E7-Pulsed Autologous Dendritic Cells in Patients with Human Papillomavirus Type 16- and 18-Positive Cervical Cancer," Journal of Virology, Jul. 1999, vol. 73, No. 7, pp. 5402-5410.
Sato N., et al., "CC Chemokine Receptor (CCR) 2 Is Required for Langhans Cell Migration and Localization of T Helper Cell Type 1 (Th1) -Inducing Dendritic Cells: Absence of CCR2 Shifts the Leishmania Major-Resistant Phenotype to a Susceptible State Domi-

(56) References Cited

OTHER PUBLICATIONS nated by Th2 Cytokines, B Cell Outgrowth, and Sustained Neutrophilic Inflammation," Journal of Experimental Medicine, The Rockefeller University Press, Jul. 17, 2000, vol. 192, No. 2, pp. 205-218.
Schroeder M.A., et al., "Pegylated Murine GM-CSF Increases Myeloid Derived Suppressor Cells In Vivo," Blood, 2011, vol. 118, No. 21, p. 2967, ISSN: 0003513278.
Second Examiner's Report and Examination Search Report from Counterpart Canadian Patent Application No. 2,885,741, dated Aug. 10, 2020, 4 Pages.
Second Office Action and Supplementary Search Report for Corresponding Chinese Application No. 201380060902.8, dated Mar. 31, 2017, 28 Pages.
Shimizu T., et al., "Antitumor Activity, Mitogenicity, and Lethal Toxicity of Chemical Synthesized Monosaccharide Analog of Lipid A," J. Pharmacobiodyn, 1988, vol. 11, No. 7, pp. 512-518.
Shinozaki Y., et al., "Tumor-specific Cytotoxic T Cell Generation and Dendritic Cell Function Are Differentially Regulated by Interleukin 27 During Development of Anti-tumor Immunity," International Journal of Cancer, 2009, vol. 124, No. 6, pp. 1372-1378.
Sinha P., et al., "Cross-Talk Between Myeloid-Derived Suppressor Cells and Macrophages Subverts Tumor Immunity Toward a Type 2 Response," The Journal of Immunology, 2007, vol. 179, pp. 977-983.
Song Y.K., et al., "Free Liposomes Enhance the Transfection Activity of DNA/Lipid Complexes in Vivo by Intravenous Administration," Biochimica et Biophysica Acta, 1998, vol. 1372, pp. 141-150.
Sprott G.D., et al., "Activation of Dendritic Cells by Liposomes Prepared from Phosphatidylinositol Mannosides from *Mycobacterium Bovis* Bacillus Calmette-Guerin and Adjuvant Activity In Vivo," Infection and Immunity, Sep. 2004, vol. 72, No. 9, pp. 5235-5246.
Steller M.A., et al., "Cell-Mediated Immunological Responses in Cervical and Vaginal Cancer Patients Immunized with a Lipidated Epitope of Human Papillomavirus Type 16 E7," Clinical Cancer Research, Sep. 1998, vol. 4, pp. 2103-2109.
Sumida S.M., et al., "Recruitment and Expansion of Dendritic Cells In Vivo Potentiate the Immunogenicity of Plasmid DNA Vaccines," The Journal of Clinical Investigation, USA, Nov. 2004, vol. 114, No. 9, pp. 1334-1342.
Sun W.Q., et al., "Stability of Dry Liposomes in Sugar Glasses," Biophysical Journal, Apr. 1996, vol. 70, pp. 1769-1776.
Supplementary European Search Report for European Application No. 13804165.2, mailed Jan. 22, 2016, 07 Pages.
Taiwan Search Report for Taiwanese Application No. 107143751, dated Jul. 27, 2022, 2 Pages, with translation.
The Notice of Reasons for Rejection of Counterpart Japanese Patent Application No. 2019-518245, mailed Oct. 26, 2021, Along With an English Translation, 14 Pages.
Third Examiner's Report and Examination Search Report from Counterpart Canadian Patent Application No. 2,885,741, dated Jun. 30, 2021, Along with a Request to Withdraw Report dated Aug. 25, 2021, 5 Pages.
Third Examiner's Report from Corresponding Canadian Patent Application No. 2,876,656, dated Mar. 25, 2021, 5 Pages.
Tindle R., et al., "NCBI Blast Search Teaching Sequence 43," Genback, U.S. Pat. No. 6,183,745, 2001, 1 Page.
Tobiume K., et al., "ASK1 Is Required for Sustained Activations of JNL/p38 MAP Kinases and Apoptosis," EMBO Reports, European Molecular Biology Organization, 2001, vol. 2, No. 3, pp. 222-228.
Toledo H., et al., "A Phase I Clinical Trial of a Multi-Epitope Polypeptide TAB9 Combined with Montanide ISA720 Adjuvant in Non-HIV-1 Infected Human Volunteers," Vaccine, Elsevier Science Ltd, 2001, vol. 19, pp. 4328-4336.
Translation of Notification of Reason for Rejection from Corresponding Japanese Patent Application No. 2013-217819, mailed Jan. 10, 2017, 7 Pages.
"Transplantation," Supplement 1, 2010, vol. 90, No. 2S, pp. 519-2687, 1 Page, ISSN: 0003513279.
Tsang K.Y., et al., "Identification and Characterization of Enhancer Agonist Human Cytotoxic T-cell Epitopes of the Human Papillomavirus Type 16 (Hpv16) E6/E7," Vaccine, 2017, vol. 35, pp. 2605-2611.
Uemura A., et al, "Induction of Immune Responses Against Glycosphingolipid Antigens: Comparison of Antibody Responses in Mice Immunized With Antigen Associated With Liposomes Prepared From Various Phospholipids," Journal of Veterinary Medical Science, 2005, vol. 67, No. 12, pp. 1197-1201.
United States Patent and Trademark Office, Offic Action for U.S. Appl. No. 11/121,840, mailed Sep. 7, 2007, 6 Pages.
United States Patent and Trademark Office, Office Action for U.S. Appl. No. 11/121,840, mailed Jun. 4, 2007, 5 Pages.
Vangasseri D.P., "Immunostimulation of Dendritic Cells by Cationic Liposomes," Molecular Membrane Biology, Taylor and Francis, GB, Sep. 1, 2006, vol. 23, No. 5, pp. 385-395, DOI: 10.1080/09687860600790537, ISSN 0968-7688, XP008137311.
Varypataki E.M., et al., "Cationic Liposomes Loaded With a Synthetic Long Peptide and Poly(L:C): a Defined Adjuvanted Vaccine for Induction of Antigen-Specific T Cell Cytotoxicity," The AAPS Journal, Jan. 2015, vol. 17, No. 1, pp. 216-226.
Vasievich E. A., et al., "Enantiospecific Adjuvant Activity of Cationic Lipid DOTAP in Cancer Vaccine", Cancer Immunology, Immunotherapy, May 2011, vol. 60, No. 5, Abstract Only, 1 Page.
Vasievich E.A., et al., "Enantiospecific Adjuvant Activity of Cationic Lipid DOTAP in Cancer Vaccine," Cancer Immunology, Immunotherapy, May 1, 2011, vol. 60, No. 5, pp. 629-638, DOI:10.1007/s00262-011-0970-1, ISSN 0340-7004, XP055057926.
Vasievich E.A., et al., "Trp2 Peptide Vaccine Adjuvanted With O-dotap Inhibits Tumor Growth in an Advanced Melanoma Model," Division of Molecular Pharmaceutics, 2012, vol. 9, pp. 261-268.
Vautier-Giongo C., et al., "Effects of Interactions on the Formation of Mixed Micelles of 1.2-diheptaoyl-sn-glycero-3-phosphocholine With Sodiumdodecyl Sulfate and Dodecyltrimethylemmonuium Bromide," Journal of Colloid and Interface Science 282, 2005, pp. 149-155.
Verheul A.F.M., et al., "Monopalmitic Acid-Peptide Conjugates Induce Cytotoxic T Cell Responses Against Malarial Epitopes: Importance of Spacer Amino Acids," Journal of Immunological Methods, Elsevier Science B.V., 1995, vol. 182, pp. 219-226.
Vogel F.R., et al., "A Compendium of Vaccine Adjuvants and Excipients," Pharmaceutical biotechnology, 1995, vol. 6, 89 Pages.
Vogel F.R., "Improving Vaccine Performance With Adjuvants," Clinical Infectious Diseases, Infectious Diseases Society of America, 2000, vol. 30, Suppl. 3, pp. S266-S270.
Walker C., et al., "Cationic Lipids Direct a Viral Glycoprotein Into the Class I Major Histocompatibility Complex Antigen-presentation Pathway," Proceedings of National Acadamy Science, USA, Sep. 1992, vol. 89, pp. 7915-7918.
Wang H., et al., "Potential Involvement of Monocyte Chemoattractant Protein (MCP)-1/CCL2 in IL-4-Mediated Tumor Immunity Through Inducing Dendritic Cell Migration Into the Draining Lymph Nodes," International Immunopharmacology, Elsevier Science B.V, 2003, vol. 03, pp. 627-642.
Wang L., et al., "Lysophosphatidylcholine-Induced Surface Redistribution Regulates Signaling of the Murine G Protein-Coupled Receptor G2A," Molecular Biology of the Cell, The American Society for Cell Biology, May 2005, vol. 16, pp. 2234-2247.
Wang R-F., et al., "Enhancement of Antitumor Immunity by Prolonging Antigen Presentation on Dendritic Cells," Nature Biotechnology, Nature Publishing Group, Feb. 2002, vol. 20, pp. 149-154.
Weiss A., et al., "Intracellular Peptide Delivery Using Amphiphilic Lipid-Based Formulations," Biotechnology and Bioengineering, US, Oct. 2011, (Apr. 25, 2011), vol. 108, No. 10, pp. 2477-2487, DOI: 10.1002/bit.23182, ISSN 0006-3592, XP055250096.
Welters M.J.P., et al., "Induction of Tumor-Specific CD4+ and CD8+ T-Cell Immunity in Cervical Cancer Patients by a Human Papillomavirus Type 16 E6 and E7 Long Peptides Vaccine," Clinical Cancer Research, Jan. 1, 2008, vol. 14, No. 1, pp. 178-187.
Wenworth D.E., et al., "Hemagglutinin [Influenza A virus (A/New Caledonia/20/1999(H1N1))]," GenBank Accession # AFO65027, Jul. 26, 2012, 2 Pages.

(56) References Cited

OTHER PUBLICATIONS

Whitmore M., et al., "LPD Lipopolyplex Initiates a Potent Cytokine Response and Inhibits Tumor Growth," Gene Therapy, Stockton Press, 1999, vol. 6, pp. 1867-1875.
Wrapp D., et al., "Cryo-EM Structure of the 2019-nCoV Spike in the Prefusion Conformation," Science, Mar. 13, 2020, vol. 367, pp. 1260-1263.
Xiao X., et al., "HLA-A, HLA-B, HLA-DRB1 Polymorphisms and Risk of Cervical Squamous Epithelial Cell Carcinoma: a Population Study in China," Asian Pacific Journal of Cancer Prevention, 2013, vol. 14, No. 7, pp. 4427-4433, XP055497830.
Yamshchikov G.V., et al., "Evaluation of Peptide Vaccine Immunogenicity in Draining Lymph Nodes and Peripheral Blood of Melanoma Patients," International Journal of Immunology, Wiley-Liss, Inc., 2001, vol. 92, pp. 703-711.
Yan W., et al., "Mechanism of Adjuvant Activity of Cationic Liposome: Phosphorylation of a Map Kinase, ERK and Induction of Chemokines," Molecular Immunology, 2007, vol. 44, pp. 3672-3681.
Yao T., et al., "Integrated Basic Chemistry for Geo Science," Nanjing University Press, 2007, pp. 410-421.
Yao Y., et al., "HPV-16 E6 and E7 Protein T Cell Epitopes Prediction Analysis Based on Distributions of HLA-A Loci Across Populations: an in Silico Approach," Vaccine, 2013, vol. 31, No. 18, pp. 2289-2294, XP055497828.
Yasuda K., et al., "Endosomal Translocation of Vertebrate DNA Activates Dendritic Cells via TLR9- Dependent and Independent Pathways," The Journal of Immunology, 2005, vol. 174, pp. 6129-6136.
Yoo J.K., et al., "IL-18 Induces Monocyte Chemotactic Protein-1 Production in Macrophages Through the Phosphatidylinositol 3-Kinase/Akt and MEK/ERK1/2 Pathways," The Journal of Immunology, The American Association of Immunologists Incorporated, 2005, vol. 175, pp. 8280-8286.
Yoshimura T., et al., "Human Monocyte Chemoattractant Protein-1 (MCP-1), Full Length cDNA Cloning, Expression in Mitogen-Stimulated Blood Mononuclear Leukocytes, and Sequence Similarity to Mouse Competence Gene JE," Federation of European Biochemical Societies, Elsevier Science Publishers B.V., Feb. 1989, vol. 244, No. 2, pp. 487-493.
Yotsumoto S., et al., "Endosomal Translocation of CpG-Oligodeoxynucleotides Inhibits DNA-PKcs- Dependent IL-10 Production in Macrophages," The Journal of Immunology, 2008, vol. 180, pp. 809-816.
Yu H., et al., "Novel Chlamydia Muridarum T Cell Antigens Induce Protective Immunity Against Lung and Genital Tract Infection in Murine Models," The Journal of Immunology, 2009, vol. 182, pp. 1602-1608.
Yu J.J., et al., "Regulation and Phenotype of an Innate Th1 Cell: Role of Cytokines and the P38 Kinase Pathway," The Journal of Immunology, The American Association of Immunologists, 2003, vol. 171, pp. 6112-6118.
Zaks K., et al., "Efficient Immunization and Cross-Priming by Vaccine Adjuvants Containing TLR3 or TLR9 Agonists Complexed to Cationic Liposomes," The Journal of Immunology, 2006, vol. 176, pp. 7335-7345.
Zhang H., et al., "English Translation of Specification of CN111217918," European Patent Office, 2020, 85 pages.
Zhang H., et al., "Stress-Induced Inhibition of ERK1 and ERK2 by Direct Interaction With p38 MAP Kinase," The Journal of Biological Chemistry, The American Society for Biochemistry and Molecular BiologyInc, Mar. 9, 2001, vol. 276, No. 10, pp. 6905-6908.
Zhang L., et al., "Converting Peptides into Drug Leads by Lipidation," Current Medicinal Chemistry, 2012, vol. 19, No. 11, pp. 1602-1618, ISSN 0929-8673.
Bo, "Research Progress on Therapeutic Vaccines for Human Papillomavirus," Acta Academiae Medicinae Sinicae, vol. 29, Issue 05, Oct. 31, 2017, pp. 685-690.
Examination Report No. 1 for Australian Patent Application No. 2021200200 dated Jul. 4, 2023, 6 Pages.
Office Action for Chinese Patent Application No. 201780075219, mailed Mar. 24, 2021, 23 Pages.
Examination Report No. 1 for Australian Patent Application No. 2016354590 dated Nov. 29, 2022, 3 Pages.
Gandhapudi et al., "Recombinant Protein Vaccines Formulated with Enantio-Specific Cationic Lipid R-DOTAP Induce Protective Cellular and Antibody-Mediated Immune Responses in Mice," Viruses, Feb. 2023, 15: (432): 1-22.
Henson et al., "R-DOTAP Cationic Lipid Nanoparticles Outperform Squalene-Based Adjuvant Systems in Elicitation of CD4 T Cells after Recombinant Influenza Hemagglutinin Vaccination," Viruses, Feb. 2023, 15 (538): 1-14.
Johnson et al., "The Clinical Impact of Screening and Other Experimental Tumor Studies," Cancer Treatment Reviews, 1975, 2: 1-31.
Office Action for Canadian Patent Application No. 3005251, mailed Dec. 23, 2022, 4 pages.
Office Action for European Patent Application No. 17859111.1, mailed Mar. 13, 2023, 3 Pages.
Office Action for Israel Patent Application No. 275145, mailed Jan. 9, 2023, 7 pages.
Office Action for Japanese Patent Application No. 20210185922, mailed Dec. 20, 2022, 6 pages (with English translation).
Office Action for Korean Patent Application No. 1020197012979, mailed Dec. 25, 2022, 18 pages.
Office Action for Mexican Application No. MX/a/2019/003961 dated Mar. 7, 2023, 10 pages.
Office Action for Taiwan Patent Application No. 107143751, mailed Nov. 29, 2022, 15 Pages.
U.S. Non-Final Office Action for U.S. Appl. No. 14/531,469, dated Mar. 10, 2023, 13 pages.
U.S. Non-Final Office Action in U.S. Appl. No. 16/532,613, dated Mar. 17, 2023, 120 pages.
U.S. Non-Final Office Action in U.S. Appl. No. 16/899,763, dated Mar. 16, 2023, 52 pages.
Dalby et al., "Advanced Transfection with Lipofectamine 2000 Reagent: Primary Neurons, siRNA, and High- Throughput Applications," Methods 33, 2004, pp. 95-103.
JP Office Action in Japanese Application No. 2020-531050, dated Sep. 12, 2023, 14 pages (with English translation).
Kornek et al., "1,2-Dioleoyl-3-Trimethylammonium-Propane (DOTAP)-Formulated, Immune-Stimulatory Vascular Endothelial Growth Factor a Small Interfering RNA (siRNA) Increases Antitumoral Efficacy in Murine Orthotopic Hepatocellular Carcinoma with Liver Fibrosis," Molecular Medicine, 2008, 14(7-8):365-373.
Persano et al., "Lipopolyplex Potentiates Anti-Tumor Immunity of mRNA-based Vaccination," Biomaterials, Feb. 2017, 125:81-89.
Sayour et al. "Systemic activation of antigen-presenting cells via RNA-loaded nanoparticles," OncoImmunology, Jan. 2017, 6(1), 15 pages.
PCT Search Report and Written Opinion in International Application No. PCT/US2023/035325, dated May 10, 2024, 15 pages.
PCT Search Report and Written Opinion in International Application No. PCT/US2023/035526, dated May 17, 2024, 19 pages.
EPO; Examination Report issued in Application No. 18886648.7 on Dec. 11, 2024.
Zhao et al., "Interferon Alpha Regulates MAPK and STAT1 Pathways in Human Hepatoma Cells," Virology Journal, vol. 8, No. 157, pp. 1-7, Apr. 6, 2011.
Kranz et al., "Systemic RNA Delivery to Dendritic Exploits Antiviral Defence for Cancer Immunotherapy," Nature, vol. 534, pp. 396-409, Jun. 1, 2016.
Hyun et al., "BiVax: a Peptide/Poly-IC Subunit Vaccine that Mimics an Acute Infection Elicits Vast and Effective Anti-Tumor CD8 T-Cell Responses," Cancer Immunology Immunotherapy, vol. 62, No. 4, pp. 787-799, Apr. 1, 2013.
Asselin-Paturel et al., "Type I Interferon Dependence of Plasmacytoid Dendritic Cell Activation and Migration," JeM, vol. 201, No. 7, pp. 1157-1167, Apr. 4, 2005.
International Search Report and Written Opinion issued in Application No. PCT/US2025/028055 on Aug. 4, 2025.

* cited by examiner

METHODS AND COMPOSITIONS COMPRISING CATIONIC LIPIDS FOR STIMULATING TYPE 1 INTERFERON GENES

CROSS-REFERENCE TO RELATED APPLICATIONS

The present application claims priority to and all the benefits of U.S. Provisional Patent Application No. 62/594,815, filed on Dec. 5, 2017, which is hereby expressly incorporated herein by reference in its entirety.

BACKGROUND OF THE INVENTION

1. Field of the Invention

The present invention relates generally to methods and compositions for modifying type I IFN signaling pathways comprising the administration of cationic lipids.

2. Description of the Related Art

Type I interferons (IFN-I) in the last decade have been shown to be of critical importance in the mammalian immune response against disease. Type I interferons have been called "viral" interferons due to their direct induction by viral infections, in contrast to "immune" IFN, or IFN-γ, which is synthesized after receptor engagement of T cells and natural killer (NK) cells during immune responses. IFN-I are also well-documented inducers of tumor cell apoptosis and anti-angiogenesis via signaling through the interferon alpha receptor (IFNAR). Due to the critical role of IFN-I in the therapeutic immune response, significant emphasis is now focused on the identification of safe and effective methods of activating IFN-I in order to improve both preventive and therapeutic benefit of vaccines, immunotherapies and other immune based pharmaceuticals. For example, preclinical studies in mice have shown that IFNs-I directly activate other critical cells of the immune system, such as antigen-presenting dendritic cells (DC) and CD4 and CD8 T cells. IFNs-I also increase antigen presentation of the tumor cells to be recognized by T lymphocytes, hence presenting a key potential role in cancer immunotherapy.

In the field of vaccine development, methods and approaches that yield large numbers of potent antigen-specific cytotoxic T cells in humans in order to treat diseases caused by pathogens or to treat cancer, still remain an unmet medical need. Protein and peptide-based vaccines used in combination with immune stimulators such as adjuvants is one of the more promising approaches that have been evaluated to develop cytotoxic T cells. However, most adjuvants that are currently approved for human use are poor inducers of type I interferons and cytotoxic T cells, and have failed in establishing long lasting protective or therapeutic benefit.

Interferons (IFN-α/β/γ) are some of the more potent immune stimulatory cytokines, and play an important role in the development of CD8+ cytotoxic T cells. Interferons are also crucial for anti-viral immunity. Effective T cell immunity requires the activation of T cells with antigen (signal 1) in the presence of appropriate co-stimulatory signals (signal 2) and cytokines (signal 3) to drive a specific T cell immune response by promoting T cell expansion, survival, differentiation, and effector functions. IFN-I can act directly on T cells as signal 3 to induce T-cell activation and to drive their optimal expansion, survival and effector functions. Initially identified as anti-viral cytokines, IFN-I has been shown to enhance CD8 T cell expansion, survival and effector functions. Interferons also drive the maturation of antigen presenting cells by up regulating co-stimulatory molecules and by enhancing antigen cross presentation necessary for T cell activation. Furthermore, interferons have been demonstrated to have direct anti-tumor properties as well as indirect anti-tumor properties through IL-15 production. As a result of these significant immunological properties, various IFN-I inducing agents as well as recombinant IFN-I therapy are currently being tested in human trials.

Type I IFNs have been reported to prevent cellular transformation in vitro by sustaining expression of the tumor suppressor gene p53 (Takaoka A, Hayakawa S, Yanai H, Stoiber D, Negishi H, Kikuchi H, et al. *Integration of interferon-α/β signaling to p53 responses in tumor suppression and antiviral defense. Nature* (2003)424:516-23). Specific roles for IFN-I signaling in negatively regulating tumor cell proliferation and in triggering cell death in human cancer cell lines have also been demonstrated (Zitvogel L, Galluzzi L, Kepp O, Smyth M J, Kroemer G. *Type I interferons in anticancer immunity. Nat Rev Immunol* (2015) 15:405-14). In vivo, deletion of IFNAR1 from intestinal epithelial cells increased tumor formation in mice (Tschurtschenthaler M, Wang J, Fricke C, Fritz T M J, Niederreiter L, Adolph T E, et al. *Type I interferon signaling in the intestinal epithelium affects Paneth cells, microbial ecology and epithelial regeneration. Gut* (2014) 63:1921-31). Multiple studies have generated strong evidence that IFN-I induces antitumor effects predominantly via indirect stimulation of immune cells to rapidly eliminate malignant cells. Several studies strongly suggest that IFN-I promotes anticancer immune responses that are analogous to the reaction of the host against pathogens.

As a result of the ubiquitous IFNAR expression, IFN-I have been shown to have critical regulatory effects on immune cells in the context of inflammatory and viral diseases (Decker T, Müller M, Stockinger S. *The yin and yang of type I interferon activity in bacterial infection. Nat Rev Immunol* (2005) 5:675-87; Stetson D B, Medzhitov R. *Type I interferons in host defense. Immunity* (2006) 25:373-81). It is therefore evident that cellular mediators of the innate as well as the adaptive immune response may very well be regulated by IFN-I in protecting against malignant diseases.

IFN-I has been demonstrated to be important in tumor immune surveillance (Dunn G P, Bruce A T, Sheehan K C F, Shankaran V, Uppaluri R, Bui J D, et al. *A critical function for type I interferons in cancer immunoediting. Nat Immunol* (2005)6:722-9). As opposed to IFN-γ, IFN-I was found in bone marrow transfer experiments to act on host hematopoietic cells rather than the tumor cell itself during the induction of a protective antitumor immune response. Much has been reported on the mechanisms by which type I IFNs impact the cells of the innate and adaptive immune system in the context of tumor surveillance [Zitvogel L, Galluzzi L, Kepp O, Smyth M J, Kroemer G. *Type I interferons in anticancer immunity. Nat Rev Immunol* (2015) 15:405-14; Parker B S, Rautela J, Hertzog P J. *Antitumour actions of interferons: implications for cancer therapy. Nat Rev Cancer* (2016) 16:131-44)]. Several studies have identified a key role for type I IFNs, in the activation of host antigen presenting cells (Fuertes M B, Kacha A K, Kline J, Woo S-R, Kranz D M, Murphy K M, et al. *Host type I IFN signals are required for antitumor CD8$^+$T cell responses through CD8α$^+$dendritic cells. J Exp Med* (2011) 208:2005-16; Diamond M S, Kinder M, Matsushita H, Mashayekhi M, Dunn G P, Archambault J M, et al. *Type I interferon is selectively required by dendritic cells for immune rejection of tumors. J Exp Med* (2011) 208:1989-2003). It has been determined that the early produced type I IFNs act on the level of CD8α+ dendritic cells (DCs) that are required for the successful activation of tumor antigen-specific cytotoxic CD8+ T lymphocytes (CTLs). Type I IFN signaling specifically promotes the ability of CD8α+ DCs to cross-present antigens (Diamond M S, Kinder M, Matsushita H, Mashayekhi M, Dunn G P, Archambault J M, et al. *Type I interferon is selectively required by dendritic cells for immune rejection of tumors. J Exp Med* (2011) 208:1989-2003). It has been postulated that this effect is a result of the IFN-I to enhance the survival of DCs and therefore also enhance antigen persistence on the cell surface during cross-presentation (Lorenzi S, Mattei F, Sistigu A, Bracci L, Spadaro F, Sanchez M, et al. *Type I IFNs control antigen retention and survival of CD8α(+) dendritic cells after uptake of tumor apoptotic cells leading to cross-priming. J Immunol* (2011) 186:5142-50; Schiavoni G, Mattei F, Gabriele L. *Type I interferons as stimulators of DC-mediated cross-priming: impact on anti-tumor response. Front Immunol* (2013) 4:483). Type I IFNs promote DC maturation, differentiation, and migration (Fuertes M B, Woo S-R, Burnett B, Fu Y-X, Gajewski T F. *Type I interferon response and innate immune sensing of cancer. Trends Immunol* (2013) 34:67-73).

It is important to note that type I IFNs are able to induce the release of interleukin 15 (IL15) by DCs (Mattei F, Schiavoni G, Belardelli F, Tough D F. *IL-15 is expressed by dendritic cells in response to type I IFN, double-stranded RNA, or lipopolysaccharide and promotes dendritic cell activation. J Immunol* (2001) 167:1179-87). This promotes the survival of CD8+ memory cells and NK cells (Huntington N D. *The unconventional expression of IL-15 and its role in NK cell homeostasis. Immunol Cell Biol* (2014) 92:210-3). This effect is not restricted to NK cells. CTLs have also been shown to acquire full effector functions in response to type I IFNs (Curtsinger J M, Mescher M F. *Inflammatory cytokines as a third signal for T cell activation. Curr Opin Immunol* (2010) 22:333-40; Fuertes M B, Kacha A K, Kline J, Woo S-R, Kranz D M, Murphy K M, et al. *Host type I IFN signals are required for antitumor CD8+T cell responses through CD8α+dendritic cells. J Exp Med* (2011) 208:2005-16). Also by having the ability to impact other innate immune cell subsets such as neutrophils (Wu C-F, Andzinski L, Kasnitz N, Kroger A, Klawonn F, Lienenklaus S, et al. *The lack of type I interferon induces neutrophil-mediated pre-metastatic niche formation in the mouse lung. Int J Cancer* (2015)137:837-47; Jablonska J, Wu C-F, Andzinski L, Leschner S, Weiss S. *CXCR2-mediated tumor-associated neutrophil recruitment is regulated by IFN-β. Int J Cancer* (2014) 134:1346-58), NKT, and γδ T cells (Woo S-R, Corrales L, Gajewski T F. *Innate immune recognition of cancer. Annu Rev Immunol* (2015) 33:445-74), type I IFNs exhibit tumor-growth limiting properties.

Type I IFNs are released very early during infections (Biron C A. *Initial and innate responses to viral infections—pattern setting in immunity or disease. Curr Opin Microbiol* (1999) 2:374-81), and are important regulators of innate immune cell subsets such as DCs and NK cells in anticancer host responses. For NK cells, type I IFNs have been demonstrated in viral infection to be important in the ability to generate early responses to the infection, and are thought to enhance NK cell cytotoxicity and cytokine production (Lee C K, Rao D T, Gertner R, Gimeno R, Frey A B, Levy D E. *Distinct requirements for IFNs and STAT1 in NK cell function. J Immunol* (2000) 165:3571-7; Nguyen K B, Salazar-Mather T P, Dalod M Y, Van Deusen J B, Wei X, Liew F Y, et al. *Coordinated and distinct roles for IFN-alpha beta, IL-12, and IL-15 regulation of NK cell responses to viral infection. J Immunol* (2002) 169:4279-87).

In humans, it is reported that type I interferons are usually triggered via the engagement of pathogen associated pattern recognition receptors such as toll like receptors, NOD like receptors, and Retinoic Acid Inducible Gene I like (RIG-I) receptors. In addition, a variety of cytosolic secondary messengers (c-GMP), and cytosolic nucleic acid sensors can also trigger the type I interferon production through the activation of Stimulator of Interferon Genes (STING) pathway.

It is thought that IFN-I may mediate anti-tumor activity in a variety of ways. For example, Interferon can directly act on tumor cells altering their ability to survive and grow [Parker, B. S., J. Rautela, and P. J. Hertzog, *Antitumour actions of interferons: implications for cancer therapy. Nat Rev Cancer*, 2016. 16 (3): p. 131-443].

A number of methods are being investigated in humans to harness type I mediated immunological properties. The administration of recombinant IFN-I monotherapy has been clinically proven in the treatment of chronic hepatitis C by administration of recombinant interferon-alpha (Adrian M. Di Bisceglie, MD., Paul Martin, M.D., Chris Kassianides, M.D., Mauricio Lisker-Melman, MD., Linda Murray, R.N., Jeanne Waggoner, B.A., Zachary Goodman, M.D., Steven M Banks, Ph.D., and Jay H. Hoofnagle, M.D., *Recombinant Interferon Alfa Therapy for Chronic Hepatitis C*, Nov. 30, 1989 *N Engl J Med* 1989; 321:1506-1510). Another approach involves the administration of toll-like-receptor (TLR) agonists such as double stranded RNAs (Poly I:C), CpG oligonucleotides, Imiquimod, single standard RNA, etc. to trigger endogenous production of type I interferons (Munir Akkaya, Billur Akkaya, Patrick Sheehan, Pietro Miozzo, Mukul Rawat, Mirna Pena, Ann S Kim, Olena Kamenyeva, Juraj Kabat, Chen-Feng Qi, Silvia Bolland, Akanksha Chaturvedi and Susan K Pierce, *The Toll-like receptor ligand CpG-A induces type 1 interferons in B cells contrasting the proinflammatory inducing activity of CpG-B, J Immunol* May 1, 2017, 198 (1 Supplement) 152.4). More recently, STING pathway agonists are gaining more importance as a focused type I interferon activator for anti-tumor immunity[Corrales, L., et al., *The host STING pathway at the interface of cancer and immunity. J Clin Invest*, 2016. 126 (7): p. 2404-11].

There continues to remain however, a clear need for effective methods for promoting strong activation of the type I interferon pathway. Given the many therapeutic benefits associated with the consequences of activating the type I interferon pathway, improved methods for doing so are clearly desirable.

What is needed therefore, are improved methods and compositions for vaccines that enable the potent activation of IFN1 (IFN-α/β/γ). Furthermore, what is needed are improved methods and compositions such as vaccines that elicit a robust cytotoxic T cell immune response with or without an antigen, such as a peptide or protein antigen. Preferably, such compositions and vaccines incorporate the use of immunotherapeutic agents that are safe, easy to administer and have minimal side effects or toxicity.

SUMMARY OF THE INVENTION

Provided herein are novel methods and compositions for vaccines comprising cationic lipids as potent activators of IFN1 (IFN-α/β/γ). As described herein, the present compositions enable the induction of an effective and robust cytotoxic T cell immune response when administered to a host. The compositions comprise cationic lipids, optionally combined with peptides or protein antigens; in certain embodiments, the cationic lipids are in the form of liposomes. As described in detail below, the compositions of the present invention result in IFN-I activated cytotoxic cells that are potent in regressing established tumors in mammals such as mice. The present invention further provides the use of cationic liposomes for use in specifically activating IFN-I in order to develop more effective preventions against infectious pathogens as well as therapies for cancer and other diseases.

Other features and advantages of the present invention will be readily appreciated, as the same becomes better understood, after reading the subsequent description taken in conjunction with the accompanying drawings.

BRIEF DESCRIPTION OF THE DRAWINGS

FIGS. 4A and 4B provide graphs demonstrating the induction of type I interferon production by dendritic cells by cationic lipids. The data in FIG. 4 corresponds to an experiment wherein FIG. 4A shows Bone marrow derived dendritic cells (BMDCs) from IFNAR-Ko mice were stimulated with indicated (6-400 µM) concentrations of cationic lipids or LPS positive control (1-500 ng/ml) for 24 hrs.; and FIG. 4B shows FLT3-induced BMDCs (pDCs) and GM-CSF/IL-4 derived BMDC (cBMDCs) were stimulated with indicated concentration (6-400 µM) concentrations of cationic lipid or LPS positive control (1-500 ng/ml) for 24 hrs. To measure type I interferon production, the cell supernatants (100 µl) were added to reporter cells (B16.Blue-IFNα/β cell from InvivoGen, USA) cultures and incubated for 18 hs to stimulate the type I interferon induced production of secreted alkaline phosphatase (SEAP) by reporter cells. The SEAP activity in the reporter cell supernatants was quantified using colorimetric SEAP assay kit according to the manufacture protocol. BMDC secreted type I Interferons were quantified using a standard curve is generated using recombinant mouse IFN-β stimulated SEAP activity in the reporter cell line.

FIG. 5A shows (SEQ ID NO: 1) or RF9 peptide (B) (SEQ ID NO: 2) on day 0 and day 7. Seven days after the second vaccination, spleen from the vaccinated and control mice was processed to measure antigen-specific CD8 T cell responses induced by the vaccine formulations in the wild type and IFNAR−/− mice. Antigen-specific CD8T cell responses were assessed by measuring SIINFEKL specific (A) (SEQ ID NO: 1) and RF9 peptide specific. FIG. 5B shows (SEQ ID NO: 2) CD8 T cell production of IFN-γ in an ELISPOT assay. Data is a representative of multiple experiments with similar results. Statistical significance of the data was estimated using one-way ANOVA, and multiple comparisons were analyzed using Tukey's testing. ** Statistically significant (p<0.05) compared WT Versamune® vaccinated group.

DETAILED DESCRIPTION

Figure 1:
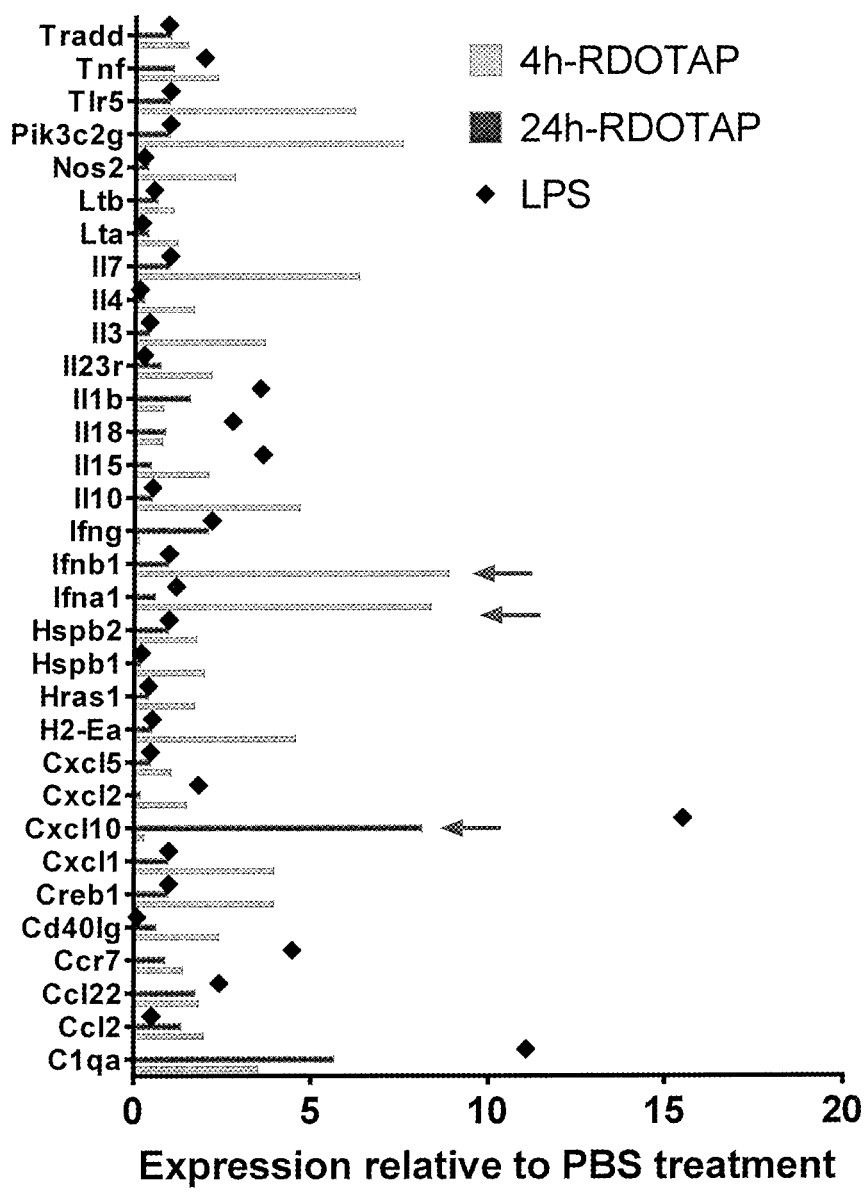
FIG. 1 provides a graph demonstrating Versamune® (R-DOTAP) induced rapid and persistent recruitment of immune cells in the draining lymph nodes. The data in FIG. 1 corresponds to an experiment wherein C57BL/6J mice (n=4) were injected with 100 µl of 12 mM R-DOTAP liposome nanoparticles subcutaneously behind the neck. Mice injected with PBS, and LPS (50 µg/mouse) (24 h time point) were used as negative and positive controls respectively. 4 h or 24 hr after injection, axillary and brachial draining lymph nodes from each mouse were pooled and processed by collagenase digestion. CD11c positive cells (~20,000 cells) in these lymph node cell suspensions were sort-purified and lysed in RLT buffer and processed for relative gene expression analysis using nCounter® mouse inflammation kit and nanostring technologies. Data demonstrate up-regulation of the type I interferon genes by R-DOTAP and represent mean of 4 mice in each group.

The present invention may be understood more readily by reference to the following detailed description of the specific embodiments included herein. Although the invention has been described with reference to specific details of certain embodiments thereof, it is not intended that such details should be regarded as limitations upon the scope of the invention.

The entire text of the references mentioned herein are hereby incorporated in their entireties by reference including U.S. Provisional Patent Application Ser. No. 62/594,815, U.S. Pat. Nos. 7,303,881, 8,877,206, 9,789,129, and U.S. patent application Ser. Nos. 14/344,327, 14/407,419, 14/429,123, and 15/775,680.

Provided herein are novel methods and compositions comprising the use of cationic lipids, for the modification of type I Interferon genes. In certain embodiments the type I Interferon genes are upregulated and induce or activate type I interferon signaling. In certain embodiments the type I Interferon genes are downregulated and depress or deactivate type I interferon signaling. Also provided are novel methods and compositions comprising the use of cationic lipids to promote and increase the potency of the disease-specific CD8+ T-cell population via the effect of the type I interferons. In certain embodiments, the methods and compositions claimed herein may comprise the use of disease-specific antigens intended to direct the cytolytic activity against specific infected or diseased cells.

Cationic liposomes have been extensively used in-vivo for delivering small molecular weight drugs, plasmid DNA, oligonucleotides, proteins, and peptides and also as vaccine adjuvants. In the present invention, as a result of studies performed to better understand how cationic lipids may interact with the immune system and the mechanistic reasons for the ability of certain cationic lipids to facilitate cross presentation, the unique ability of cationic lipids to upregulate type I interferons was discovered. It was reported that the early produced type I IFNs act on the level of $CD8\alpha^+$ dendritic cells (DCs) that are required for the successful activation of tumor antigen-specific cytotoxic $CD8^+$ T lymphocytes (CTLs), and Type I IFN signaling specifically promotes the ability of $CD8\alpha^+$ DCs to cross-present antigens. This ability of cationic lipids to facilitate antigen cross presentation leading to antigen-specific CD8+ T-cell responses has now been demonstrated in both pre-clinical and human clinical studies. The ability to use cationic lipids to safely activate type I interferons to promote antigen cross presentation and induction of CD8+ T-cells in humans presents the potential to successfully addresses a significant unmet medical need in the field of therapeutic immunology.

In an embodiment contemplated herein, a cationic lipid is administered to activate the Type I interferon pathway in a subject.

In another embodiment in, a cationic lipid is combined with a disease-specific antigen to activate Type I interferons and to facilitate cross presentation of antigens to prime disease-specific CD8+ T-cells to treat a disease in a subject.

In another embodiment a method of treating cancer is provided wherein the method comprises the step of treating the subject with a Type I interferon-activating cationic lipid combined with a protein antigen.

In another embodiment a method of treating cancer is provided wherein the method comprises the step of treating the subject with a cationic lipid combined with a T-cell activating vaccine.

In another embodiment a method of treating cancer is provided wherein the method comprises the step of treating the subject with a cationic lipid combined with a protein or peptide tumor antigen, and in combination with an adjuvant.

In another embodiment a method of treating cancer is provided wherein the method comprises the step of treating the subject with a cationic lipid combined with any tumor antigen including a DNA or RNA-based antigen.

In another embodiment a method of treating cancer is provided wherein the method comprises the step of treating the subject with a cationic lipid to activate the type I interferon pathway optionally combined with a tumor antigen in combination with an adjuvant and/or any agent that combats tumor immune suppression via reduction of MDSC, Tregs or blocking of immune check points.

In another embodiment a method of treating cancer is provided wherein the method comprises the step of treating the subject with a cationic lipid-based vaccine combined with a DNA or RNA-based tumor antigen in combination with an adjuvant and/or any agent that combats tumor immune suppression.

In yet another embodiment, a method of augmenting an anti-tumor immune response in a mammal is provided. The method comprises the step of treating the mammal with a type I interferon-activating cationic lipid or with one or more cationic lipids together with growth factors in some cases such as GM-CSF and cytokines.

In the various embodiments, the composition comprises one or more lipids with at least one type I interferon-activating cationic lipid and at least one antigen. In certain embodiments, more than one antigen is included.

In an embodiment, methods and compositions for modifying a type I IFN signaling pathway in a subject, such as a mammal, are provided wherein the methods comprise administration of compositions comprising cationic lipids to the subject. In an embodiment, the cationic lipid comprises 1,2-dioleoyl-3-trimethylammonium propane (DOTAP), N-1-(2,3-dioleoyloxy)-propyl-N,N,N-trimethyl ammonium chloride (DOTMA), 1,2-dioleoyl-sn-glycero-3-ethylphosphocholine (DOEPC), and combinations thereof. The compositions may comprise specific enantiomers of the cationic lipid. In an embodiment the cationic lipid is 1,2-dioleoyl-3-trimethylammonium propane (DOTAP), in an embodiment, the cationic lipid is the R enantiomer of DOTAP, (R)-1,2-dioleoyl-3-trimethylammonium propane (R-DOTAP). In certain embodiments, the compositions further comprise antigens, such as proteins or peptide antigens.

In certain embodiments, modification of the type I IFN signaling pathway in a subject comprises down upregulation or activation of the pathway. In certain embodiments, modification of the type I IFN signaling pathway in a subject comprises down regulation or deactivation of the pathway. In certain embodiments, the T-cell response is elevated, the antigen-specific CD8+ T cell responses are elevated, and/or the immunogenicity of the composition is enhanced. In an embodiment, a method for treating cancer in a subject is provided, wherein the method comprises the administration of a composition comprising a cationic lipid and wherein the administration of the cationic lipid results in the stimulation of a type I IFN signaling pathway.

Antigens

In an embodiment, the novel methods claimed herein comprise the administration of cationic lipids with one or more autologous antigens such as antigens derived from a subject's own tumor. In another embodiment, the methods comprise the administration of composition comprising a cationic lipid in combination with one or more non-autologous antigen(s) such as, but not limited to, synthetic peptides, recombinant proteins, RNA or DNA or active fragments thereof. In each case the objective is to activate the type I interferons to facilitate induction of a strong antigen-specific CD8+ T-cell response. The antigen can be any disease-associated antigen known to one skilled in the art.

A "tumor-associated antigen," as used herein is a molecule or compound (e.g., a protein, peptide, polypeptide, lipoprotein, lipopeptide, glycoprotein, glycopeptides, lipid, glycolipid, carbohydrate, RNA, and/or DNA, or active fragment thereof) associated with a tumor or cancer cell and which is capable of provoking an immune response (humoral and/or cellular) when expressed on the surface of an antigen presenting cell in the context of an MHC molecule. Tumor-associated antigens include self-antigens, as well as other antigens that may not be specifically associated with a cancer, but nonetheless enhance an immune response to and/or reduce the growth of a tumor or cancer cell when administered to an animal. Additional specific embodiments are provided herein.

A "microbial antigen," as used herein, is an antigen of a microorganism and includes, but is not limited to, infectious virus, infectious bacteria, infectious parasites and infectious fungi. Microbial antigens may be intact microorganisms, and natural isolates, fragments, or derivatives thereof, synthetic compounds which are identical to or similar to naturally-occurring microbial antigens and, preferably, induce an immune response specific for the corresponding microorganism (from which the naturally-occurring microbial antigen originated). In a preferred embodiment, a compound is similar to a naturally-occurring microorganism antigen if it induces an immune response (humoral and/or cellular) similar to a naturally-occurring microorganism antigen. Compounds or antigens that are similar to a naturally-occurring microorganism antigen are well known to those of ordinary skill in the art such as, for example, a protein, peptide, polypeptide, lipoprotein, lipopeptide, glycoprotein, glycopeptides, lipid, glycolipid, carbohydrate, RNA, and/or DNA. Another non-limiting example of a compound that is similar to a naturally-occurring microorganism antigen is a peptide mimic of a polysaccharide antigen. More specific embodiments are provided herein.

The term "antigen" is further intended to encompass peptide or protein analogs of known or wild-type antigens such as those described in this specification. The analogs may be more soluble or more stable than wild type antigen, and may also contain mutations or modifications rendering the antigen more immunologically active. Antigen can be modified in any manner, such as adding lipid or sugar moieties, mutating peptide or protein amino acid sequences, mutating the DNA or RNA sequence, or any other modification known to one skilled in the art. Antigens can be modified using standard methods known by one skilled in the art.

Also useful in the compositions and methods of the present invention are peptides or proteins which have amino acid sequences homologous with a desired antigen's amino acid sequence, where the homologous antigen induces an immune response to the respective tumor, microorganism or infected cell.

In an embodiment, the methods described herein comprise compositions wherein the cationic lipid is administered without an antigen to activate the type I interferons in order to facilitate a desired immune response to treat a disease in a subject, for example by activating natural killer cells to attack and kill diseased or infected cells. In another embodiment, the methods of the present invention comprise compositions wherein the cationic lipid is administered with an antigen(s), wherein the antigen may be associated with a tumor or cancer, i.e., a tumor-associated antigen, to develop an immunotherapeutic to prevent or treat a tumor. As such, in one embodiment, the tumor or immunotherapy of the present invention further comprises at least one epitope of at least one tumor-associated antigen. In another embodiment, the immunotherapeutic methods of the present invention further comprise a plurality of epitopes from one or more tumor-associated antigens. The tumor-associated antigens used with the cationic lipids and methods of the present invention can be inherently immunogenic, or non-immunogenic, or slightly immunogenic. As demonstrated herein, even tumor-associated self-antigens may be advantageously employed in the subject immunotherapies for therapeutic effect, since the subject compositions are capable of activating the Type I interferons (IFNs) which are known to mediate antitumor effects against several tumor types. Exemplary antigens include, but are not limited to, synthetic, recombinant, foreign, or homologous antigens, and antigenic materials may include but are not limited to proteins, peptides, polypeptides, lipoproteins, lipopeptides, lipids, glycolipids, carbohydrates, RNA and DNA. Examples of such therapies include, but are not limited to the treatment or prevention of breast cancer, head and neck cancer, melanoma, cervical cancer, lung cancer, prostate cancer gut carcinoma, or any other cancer known in the art susceptible to immunotherapy. In such therapies it is also possible to combine the antigen with the cationic lipid without encapsulation.

Tumor-associated antigens suitable for use in the present invention include both naturally occurring and modified molecules which may be indicative of single tumor type, shared among several types of tumors, and/or exclusively expressed or overexpressed in tumor cells in comparison with normal cells. In addition to proteins, glycoproteins, lipoproteins, peptides, and lipopeptides, tumor-specific patterns of expression of carbohydrates, gangliosides, glycolipids, and mucins have also been documented. Exemplary tumor-associated antigens for use in cancer vaccines include protein products of oncogenes, tumor suppressor genes, and other genes with mutations or rearrangements unique to tumor cells, reactivated embryonic gene products, oncofetal antigens, tissue-specific (but not tumor-specific) differentiation antigens, growth factor receptors, cell surface carbohydrate residues, foreign viral proteins, and a number of other self-proteins.

Specific embodiments of tumor-associated antigens include, e.g., mutated or modified antigens such as the protein products of the Ras p21 protooncogenes, tumor suppressor p53 and HER-2/neu and BCR-abl oncogenes, as well as CDK4, MUM1, Caspase 8, and Beta catenin; overexpressed antigens such as galectin 4, galectin 9, carbonic anhydrase, Aldolase A, PRAME, Her2/neu, ErbB-2 and KSA, oncofetal antigens such as alpha fetoprotein (AFP), human chorionic gonadotropin (hCG); self antigens such as carcinoembryonic antigen (CEA) and melanocyte differentiation antigens such as Mart 1/Melan A, gp100, gp75, Tyrosinase, TRP1 and TRP2; prostate associated antigens such as PSA, PAP, PSMA, PSM-P1 and PSM-P2; reactivated embryonic gene products such as MAGE 1, MAGE 3, MAGE 4, GAGE 1, GAGE 2, BAGE, RAGE, and other cancer testis antigens such as NY-ESO1, SSX2 and SCP1; mucins such as Muc-1 and Muc-2; gangliosides such as GM2, GD2 and GD3, neutral glycolipids and glycoproteins such as Lewis (y) and globo-H; and glycoproteins such as Tn, Thompson-Freidenreich antigen (TF) and sTn. Also included as tumor-associated antigens herein are whole cell and tumor cell lysates as well as immunogenic portions thereof, as well as immunoglobulin idiotypes expressed on monoclonal proliferations of B lymphocytes for use against B cell lymphomas.

Tumor-associated antigens and their respective tumor cell targets include, e.g., cytokeratins, particularly cytokeratin 8, 18 and 19, as antigens for carcinoma. Epithelial membrane antigen (EMA), human embryonic antigen (HEA-125), human milk fat globules, MBr1, MBr8, Ber-EP4, 17-1A, C26 and T16 are also known carcinoma antigens. Desmin and muscle-specific actin are antigens of myogenic sarcomas. Placental alkaline phosphatase, beta-human chorionic gonadotropin, and alpha-fetoprotein are antigens of trophoblastic and germ cell tumors. Prostate specific antigen is an antigen of prostatic carcinomas, carcinoembryonic antigen of colon adenocarcinomas. HMB-45 is an antigen of melanomas. In cervical cancer, useful antigens could be encoded by human papilloma virus. Chromagranin-A and synaptophysin are antigens of neuroendocrine and neuroectodermal tumors. Of particular interest are aggressive tumors that form solid tumor masses having necrotic areas. The lysis of such necrotic cells is a rich source of antigens for antigen-presenting cells, and thus the subject therapy may find advantageous use in conjunction with conventional chemotherapy and/or radiation therapy.

Tumor-associated antigens can be prepared by methods well known in the art. For example, these antigens can be prepared from cancer cells either by preparing crude extracts of cancer cells (e.g., as described in Cohen et al., Cancer Res., 54:1055 (1994)), by partially purifying the antigens, by recombinant technology, or by de novo synthesis of known antigens. The antigen may also be in the form of a nucleic acid encoding an antigenic peptide in a form suitable for expression in a subject and presentation to the immune system of the immunized subject. Further, the antigen may be a complete antigen, or it may be a fragment of a complete antigen comprising at least one epitope.

Antigens derived from pathogens known to predispose to certain cancers may also be advantageously included in the cancer vaccines of the present invention. It is estimated that close to 16% of the worldwide incidence of cancer can be attributed to infectious pathogens; and a number of common malignancies are characterized by the expression of specific viral gene products. Thus, the inclusion of one or more antigens from pathogens implicated in causing cancer may help broaden the host immune response and enhance the prophylactic or therapeutic effect of the cancer vaccine. Pathogens of particular interest for use in the cancer vaccines provided herein include the, hepatitis B virus (hepatocellular carcinoma), hepatitis C virus (heptomas), Epstein Barr virus (EBV) (Burkitt lymphoma, nasopharynx cancer, PTLD in immunosuppressed individuals), HTLVL (adult T cell leukemia), oncogenic human papilloma viruses types 16, 18, 33, 45 (adult cervical cancer), and the bacterium *Helicobacter pylori* (B cell gastric lymphoma). Other medically relevant microorganisms that may serve as antigens in mammals and more particularly humans are described extensively in the literature, e.g., C. G. A Thomas, Medical Microbiology, Bailliere Tindall, Great Britain 1983, the entire contents of which is hereby incorporated by reference.

In another embodiment, the antigen comprises an antigen derived from or associated with a pathogen, i.e., a microbial antigen. As such, in one embodiment, the pathogen vaccines of the present invention further comprise at least one epitope of at least one microbial antigen. Pathogens that may be targeted by the subject immunotherapies include, but are not limited to, viruses, bacteria, parasites and fungi. In another embodiment, the pathogen vaccines of the present invention further comprise a plurality of epitopes from one or more microbial antigens.

The microbial antigens finding use in the cationic lipid immunotherapies and methods may be inherently immunogenic, or non-immunogenic, or slightly immunogenic. Exemplary antigens include, but are not limited to, synthetic, recombinant, foreign, or homologous antigens, and antigenic materials may include but are not limited to proteins, peptides, polypeptides, lipoproteins, lipopeptides, lipids, glycolipids, carbohydrates, RNA, and DNA.

Exemplary viral pathogens include, but are not limited to, viruses that infect mammals, and more particularly humans. Examples of virus include, but are not limited to: Retroviridae (e.g., human immunodeficiency viruses, such as HIV-1 (also referred to as HTLV-III, LAV or HTLV-III/LAV, or HIV-III; and other isolates, such as HIV-LP; Picornaviridae (e.g. polio viruses, hepatitis A virus; enteroviruses, human Coxsackie viruses, rhinoviruses, echoviruses); Calciviridae (e.g. strains that cause gastroenteritis); Togaviridae (e.g. equine encephalitis viruses, rubella viruses); Flaviridae (e.g. dengue viruses, encephalitis viruses, yellow fever viruses); Coronoviridae (e.g. coronaviruses); Rhabdoviradae (e.g. vesicular stomatitis viruses, rabies viruses); Coronaviridae (e.g. coronaviruses); Rhabdoviridae (e.g. vesicular stomatitis viruses, rabies viruses); Filoviridae (e.g. ebola viruses); Paramyxoviridae (e.g. parainfluenza viruses, mumps virus, measles virus, respiratory syncytial virus); Orthomyxoviridae (e.g. influenza viruses); Bungaviridae (e.g. Hantaan viruses, bunga viruses, phleboviruses and Nairo viruses); Arena viridae (hemorrhagic fever viruses); Reoviridae (e.g. reoviruses, orbiviurses and rotaviruses); Birnaviridae; Hepadnaviridae (Hepatitis B virus); Parvovirida (parvoviruses); Papovaviridae (papilloma viruses, polyoma viruses); Adenoviridae (most adenoviruses); Herpesviridae herpes simplex virus (HSV) 1 and 2, varicella zoster virus, cytomegalovirus (CMV), herpes virus; Poxyiridae (variola viruses, vaccinia viruses, pox viruses); and Iridoviridae (e.g. African swine fever virus); and unclassified viruses (e.g. the etiological agents of Spongiform encephalopathies, the agent of delta hepatitis (thought to be a defective satellite of hepatitis B virus), the agents of non-A, non-B hepatitis (class 1=internally transmitted; class 2=parenterally transmitted (i.e. Hepatitis C); Norwalk and related viruses, and astroviruses).

Also, gram negative and gram positive bacteria may be targeted by the subject compositions and methods in vertebrate animals. Such gram positive bacteria include, but are not limited to *Pasteurella* species, Staphylococci species, and *Streptococcus* species. Gram negative bacteria include, but are not limited to, *Escherichia coli, Pseudomonas species*, and *Salmonella* species. Specific examples of infectious bacteria include but are not limited to: *Helicobacter pyloris, Borella burgdorferi, Legionella pneumophiliaii, Mycobacteria* sps (e.g. *M. tuberculosis, M. avium, M. intracellulare, M. kansaii, M. gordonae), Staphylococcus aureus, Neisseria gonorrhoeae, Neisseria meningitidis, Listeria monocytogenes, Streptococcus pyogenes* (Group A *Streptococcus), Streptococcus agalactiae* (Group B *Streptococcus), Streptococcus (viridans* group), *Streptococcus faecalis, Streptococcus bovis, Streptococcus (anaerobic* sps.), *Streptococcus pneumoniae,* pathogenic *Campylobacter* sp., *Enterococcus* sp., *Haemophilus infuenzae, Bacillus antracis, Corynebacterium diphtheriae, corynebacterium* sp., *Erysipelothrix rhusiopathiae, Clostridium perfringers, Clostridium tetani, Enterobacter aerogenes, Klebsiella pneumoniae, Pasteurella multocida, Bacteroides* sp., *Fusobacterium nucleatumii, Streptobacillus moniliformis, Treponema pallidium, Treponema pertenue, Leptospira, Rickettsia*, and *Actinomyces* israelli.

Polypeptides of bacterial pathogens which may find use as sources of microbial antigens in the subject compositions include but are not limited to an iron-regulated outer membrane protein, ("IROMP"), an outer membrane protein ("OMP"), and an A-protein of *Aeromonis salmonicida* which causes furunculosis, p57 protein of Renibacterium salmoninarum which causes bacterial kidney disease ("BKD"), major surface associated antigen ("msa"), a surface expressed cytotoxin ("mpr"), a surface expressed hemolysin ("ish"), and a flagellar antigen of Yersiniosis; an extracellular protein ("ECP"), an iron-regulated outer membrane protein ("IROMP"), and a structural protein of Pasteurellosis; an OMP and a flagellar protein of *Vibrosis anguillarum* and *V. ordalii*; a flagellar protein, an OMP protein, aroA, and purA of *Edwardsiellosis ictaluri* and *E. tarda*; and surface antigen of *Ichthyophthirius*; and a structural and regulatory protein of *Cytophaga columnari*; and a structural and regulatory protein of *Rickettsia*. Such antigens can be isolated or prepared recombinantly or by any other means known in the art.

Examples of pathogens further include, but are not limited to, fungi that infect mammals, and more particularly humans Examples of fungi include, but are not limited to: *Cryptococcus neoformansi, Histoplasma capsulatum, Coccidioides immitis, Blastomyces dermatitidis, Chlamydia trachomatis, Candida albicans*. Examples of infectious parasites include *Plasmodium* such as *Plasmodium falciparum, Plasmodium malariae, Plasmodium ovale*, and *Plasmodium vivax*. Other infectious organisms (i.e. protists) include *Toxoplasma gondii*. Polypeptides of a parasitic pathogen include but are not limited to the surface antigens of *Ichthyophthirius*.

Other medically relevant microorganisms that serve as antigens in mammals and more particularly humans are described extensively in the literature, e.g., see C. G. A Thomas, Medical Microbiology, Bailliere Tindall, Great Britain 1983, the entire contents of which is hereby incorporated by reference. In addition to the treatment of infectious human diseases and human pathogens, the compositions and methods of the present invention are useful for treating infections of nonhuman mammals. Many vaccines for the treatment of non-human mammals are disclosed in Bennett, K. Compendium of Veterinary Products, 3rd ed. North American Compendiums, Inc., 1995; see also WO 02/069369, the disclosure of which is expressly incorporated by reference herein.

Exemplary non-human pathogens include, but are not limited to, mouse mammary tumor virus ("MMTV"), Rous sarcoma virus ("RSV"), avian leukemia virus ("ALV"), avian myeloblastosis virus ("AMV"), murine leukemia virus ("MLV"), feline leukemia virus ("FeLV"), murine sarcoma virus ("MSV"), gibbon ape leukemia virus ("GALV"), spleen necrosis virus ("SNV"), reticuloendotheliosis virus ("RSV"), simian sarcoma virus ("SSV"), Mason-Pfizer monkey virus ("MPMV"), simian retrovirus type 1 ("SRV-1"), lentiviruses such as HIV-1, HIV-2, SIV, Visna virus, feline immunodeficiency virus ("FIV"), and equine infectious anemia virus ("EIAV"), T-cell leukemia viruses such as HTLV-1, HTLV-II, simian T-cell leukemia virus ("STLV"), and bovine leukemia virus ("BLV"), and foamy viruses such as human foamy virus ("HFV"), simian foamy virus ("SFV") and bovine foamy virus ("BFV").

In some embodiments, "treatment," "treat," and "treating," as used herein with reference to infectious pathogens, refer to a prophylactic treatment which increases the resistance of a subject to infection with a pathogen or decreases the likelihood that the subject will become infected with the pathogen; and/or treatment after the subject has become infected in order to fight the infection, e.g., reduce or eliminate the infection or prevent it from becoming worse.

Microbial antigens can be prepared by methods well known in the art. For example, these antigens can be prepared directly from viral and bacterial cells either by preparing crude extracts, by partially purifying the antigens, or alternatively by recombinant technology or by de novo synthesis of known antigens. The antigen may also be in the form of a nucleic acid encoding an antigenic peptide in a form suitable for expression in a subject and presentation to the immune system of the immunized subject. Further, the antigen may be a complete antigen, or it may be a fragment of a complete antigen comprising at least one epitope.

In order to improve incorporation of the antigen into the cationic lipid vesicles and also to improve delivery to the cells of the immune system, the antigen may be modified to increase its hydrophobicity or the negative charge on the antigen. Hydrophobicity of an antigen may be increased such as, for example, by conjugating to a lipid chain or hydrophobic amino acids in order to improve it's the antigen's solubility in the hydrophobic acyl chains of the cationic lipid, while maintaining the antigenic properties of the molecule. The modified antigen can be a lipoprotein, a lipopeptide, a protein or peptide modified with an amino acid sequence having increased hydrophobicity, and combinations thereof. The modified antigen may have a linker conjugated between the lipid and the antigen such as, for example, an N-terminal alpha. or .epsilon.-palmitoyl lysine may be connected to antigen via a dipeptide serine-serine linker. Further, the antigen may be manipulated to increase its negative charge by altering the formulation buffer in which the antigen is encapsulated into the cationic lipid complexes or by covalently attaching anionic moieties such as, for example, anionic amino acids to the antigen.

In some embodiments described herein, the cationic lipid may be in the form of nanoparticle assemblies. As used herein, the term "nanoparticle" refers to a particle having a size measured on the nanometer scale. As used herein, the "nanoparticle" refers to a particle having a structure with a size of less than about 10,000 nanometers. In some embodiments, the nanoparticle is a liposome.

The cationic lipid compositions of the present invention may form liposomes that are optionally mixed with antigen and may contain the chiral cationic lipids alone or chiral cationic lipids in combination with neutral lipids. Suitable chiral cationic lipid species include, but are not limited to the R and S enantiomers.

As used herein, the term "cationic lipid" refers to any of a number of lipid species which carry a net positive charge at physiological pH or have a protonatable group and are positively charged at pH lower than the pKa. Suitable cationic lipids according to the present disclosure may include, but are not limited to: 3-β[$^{4}$N—($^{1}$N,$^{8}$-diguanidino spermidine)-carbamoyl]cholesterol (BGSC); 3-β[N,N-diguanidinoethyl-aminoethane)-carbamoyl]cholesterol; BGTC); N,N$^{1}$N$^{2}$N$^{3}$Tetra-methyltetrapalmitylspermine (cellfectin); N-t-butyl-N'-tetradecyl-3-tetradecyl-aminopropion-amidine (CLONfectin); dimethyldioctadecyl ammonium bromide (DDAB); 1,2-dimyristyloxypropyl-3-dimethyl-hydroxy ethyl ammonium bromide (DMRIE); 2,3-dioleoyloxy-N-[2(sperminecarboxamido)ethyl]-N,N-dimethyl-1-propanaminium trifluorocetate) (DOSPA); 1,3-dioleoyloxy-2-(6-carboxyspermyl)-propylamide (DOSPER); 4-(2,3-bis-palmitoyloxy-propyl)-1-methyl-1H-imidazole (DPIM) N,N, N',N'-tetramethyl-N,N'-bis(2-hydroxyethyl)-2,3-dioleoyloxy-1,4-butane-diammonium iodide) (Tfx-50); N-1-(2,3-dioleoyloxy)propyl-N,N,N-trimethyl ammonium chloride (DOTMA) or other N—(N,N-1-dialkoxy)-alkyl-N,N,N-trisubstituted ammonium surfactants; 1,2 dioleoyl-3-(4'-trimethylammonio) butanol-sn-glycerol (DOBT) or cholesteryl (4'trimethylammonia) butanoate (ChOTB) where the trimethylammonium group is connected via a butanol spacer arm to either the double chain (for DOTB) or cholesteryl group (for ChOTB); DORI (DL-1,2-dioleoyl-3-dimethylaminopropyl-.beta.-hydroxy-ethylammonium) or DORIE (DL-1,2-O-dioleoyl-3-dimethylaminopropyl-.beta.-hydroxyethylammonium) (DORIE) or analogs thereof as disclosed in WO 93/03709; 1,2-dioleoyl-3-succinyl-sn-glycerol choline ester (DOSC); cholesteryl hemisuccinate ester (ChOSC); lipopolyamines such as dioctadecylamidoglycylspermine (DOGS) and dipalmitoyl phosphatidylethanolamylspermine (DPPES), cholesteryl-3.beta.-carboxyl-amido-ethylenetrimethylammonium iodide, 1-dimethylamino-3-trimethylammonio-DL-2-propyl-cholesteryl carboxylate iodide, cholesteryl-3-O-carboxyamidoethyleneamine, cholesteryl-3-.beta.-oxysuccinamido-ethylenetrimethylammonium iodide, 1-dimethylamino-3-trimethylammonio-DL-2-propyl-cholesteryl-3-.beta.-oxysu-ccinate iodide, 2-(2-trimethylammonio)-ethylmethylamino ethyl-cholesteryl-3-.beta.-oxysuccinate iodide, 3-.beta.-N—(N',N'-dimethylaminoethane) carbamoyl cholesterol (DC-chol), and 3-.beta.-N-(polyethyleneimine)-carbamoylcholesterol; O,O'-dimyristyl-N-lysyl aspartate (DMKE); O,O'-dimyristyl-N-lysyl-glutamate (DMKD); 1,2-dimyristyloxypropyl-3-dimethyl-hydroxy ethyl ammonium bromide (DMRIE); 1,2-dilauroyl-sn-glycero-3-ethylphosphocholine (DLEPC); 1,2-dimyristoyl-sn-glycero-3-ethylphosphocholine (DMEPC); 1,2-dioleoyl-sn-glycero-3-ethylphosphocholine (DOEPC); 1,2-dipalmitoyl-sn-glycero-3-ethylphosphocholine (DPEPC); 1,2-distearoyl-sn-glycero-3-ethylphosphocholine (DSEPC); 1,2-dioleoyl-3-trimethylammonium propane (DOTAP); dioleoyl dimethylaminopropane (DODAP); 1,2-palmitoyl-3-trimethylammonium propane (DPTAP); 1,2-distearoyl-3-trimethylammonium propane (DSTAP), 1,2-myristoyl-3-trimethylammonium propane (DMTAP); and sodium dodecyl sulfate (SDS). Furthermore, structural variants and derivatives of the any of the described cationic lipids are also contemplated.

In some embodiments, the cationic lipid is selected from the group consisting of DOTAP, DOTMA, DOEPC, and combinations thereof. In other embodiments, the cationic lipid is DOTAP. In yet other embodiments, the cationic lipid is DOTMA. In other embodiments, the cationic lipid is DOEPC. In some embodiments, the cationic lipid is purified.

In some embodiments, the cationic lipid is an enantiomer of a cationic lipid. The term "enantiomer" refers to a stereoisomer of a cationic lipid which is a non-superimposable mirror image of its counterpart stereoisomer, for example R and S enantiomers. In various examples, the enantiomer is R-DOTAP or S-DOTAP. In one example, the enantiomer is R-DOTAP. In another example, the enantiomer is S-DOTAP. In some embodiments, the enantiomer is purified. In various examples, the enantiomer is R-DOTMA or S-DOTMA. In one example, the enantiomer is R-DOTMA. In another example, the enantiomer is S-DOTMA. In some embodiments, the enantiomer is purified. In various examples, the enantiomer is R-DOEPC or S-DOEPC. In one example, the enantiomer is R-DOEPC. In another example, the enantiomer is S-DOEPC. In some embodiments, the enantiomer is purified.

It should be noted that for the purposes of illustration several examples are performed utilizing a model HPV antigen which has been well studied and which serves as a suitable antigen to illustrate the effect of type I interferon upregulation on antigen cross presentation to CD8+ T-cells.

In general, when referring to treatment, the compositions discussed herein may be administered orally, parenterally (e.g., intravenously or subcutaneous administration), by intramuscular injection, by intraperitoneal injection, transdermally, extracorporeally, by intracavity administration, transdermally, or topically or the like, including topical intranasal administration or administration by inhalant. The topical administration can be ophthalmically, vaginally, rectally, or intranasally. As used herein, "topical intranasal administration" means delivery of the compositions into the nose and nasal passages through one or both of the nares and can comprise delivery by a spraying mechanism or droplet mechanism, or through aerosolization of the nucleic acid or vector. Administration of the compositions by inhalant can be through the nose or mouth via delivery by a spraying or droplet mechanism Delivery can also be directly to any area of the respiratory system (e.g., lungs) via intubation.

As used herein, "parenteral administration" of the composition, if used, is generally characterized by injection. Injectables can be prepared in conventional forms, either as liquid solutions or suspensions, solid forms suitable for solution of suspension in liquid prior to injection, or as emulsions. Parenteral administration includes use of a slow release, a time release or a sustained release system such that a constant dosage is maintained.

The term "therapeutically effective" means that the amount of the composition used is of sufficient quantity to ameliorate one or more causes or symptoms of a disease or disorder, such as aberrant cell growth, tumor development, and cancer. Such amelioration only requires a reduction or alteration, not necessarily elimination. Such amelioration may comprise the elicitation of an immune response. Effective dosages and schedules for administering the disclosed compositions may be determined empirically, and making such determinations is within the skill in the art. The dosage ranges for the administration of the compositions are those large enough to produce the desired effect in which the symptoms of the disorder are affected. The dosage should not be so large as to cause adverse side effects, such as unwanted cross-reactions, anaphylactic reactions, and the like. Generally, the dosage will vary with the age, condition, sex and extent of the disease in the patient, route of administration, or whether other drugs are included in the regimen, and can be determined by one of skill in the art. The dosage can be adjusted by the individual physician in the event of any counter-indications. Dosage can vary, and can be administered in one or more dose administrations daily, for one or several days. Guidance can be found in the literature for appropriate dosages for given classes of pharmaceutical products.

The specific effective amount of the composition administered for any particular subject or patient will depend upon a variety of factors including the disease or disorder being treated and the severity of the disorder; the identity and activity of the specific composition employed; the age, body weight, general health, sex and diet of the patient; the time of administration; the route of administration; the rate of excretion of the specific composition employed; the duration of the treatment; drugs used in combination or coincidental with the specific composition employed and like factors well known in the medical arts.

For example, it is well within the skill of the art to start doses of a composition at levels lower than those required to achieve the desired therapeutic effect and to gradually increase the dosage until the desired effect is achieved. One can also evaluate the particular aspects of the medical history, signs, symptoms, and objective laboratory tests that are known to be useful in evaluating the status of a subject in need of attention for the treatment of ischemia-reperfusion injury, trauma, drug/toxicant induced injury, neurodegenerative disease, cancer, or other diseases and/or conditions. These signs, symptoms, and objective laboratory tests will vary, depending upon the particular disease or condition being treated or prevented, as will be known to any clinician who treats such patients or a researcher conducting experimentation in this field. For example, if, based on a comparison with an appropriate control group and/or knowledge of the normal progression of the disease in the general population or the particular subject or patient: (1) a subject's physical condition is shown to be improved (e.g., a tumor has partially or fully regressed), (2) the progression of the disease or condition is shown to be stabilized, or slowed, or reversed, or (3) the need for other medications for treating the disease or condition is lessened or obviated, then a particular treatment regimen will be considered efficacious.

The effective amount of a prescribed therapeutic may be given daily, every other day, weekly, monthly, bi-monthly, every other monthly, yearly, or at any other interval that is determined by the physician or provider to be effective. For example, the effective daily dose can be divided into multiple doses for purposes of administration. Consequently, single dose therapeutic can contain such amounts or submultiples thereof to make up the daily dose. Disclosed therapeutics can also be administered as part of a combination of anti-tumor or anti-cancer treatments. In an aspect, disclosed compositions can be administered to the subject or patient prior to treatment with an anti-tumor or anti-cancer treatment. In an aspect, disclosed compositions can be administered concurrently with the anti-tumor or anti-cancer treatment. In an aspect, disclosed composition can be administered subsequent to the anti-tumor or anti-cancer treatment. In an aspect, the patient or subject receives both treatments on an alternating or rotating schedule. In an aspect, the subject or patient receives a singular treatment with the disclosed composition. In an aspect, the subject or patient receives at least one treatment with the disclosed composition. In an aspect, the subject or patient receives at least one treatment with the disclosed composition and at least one other anti-tumor or anti-cancer treatment.

The dosage can be adjusted by the individual physician or the subject in the event of any counter-indications. Dosage can vary, and can be administered in one or more dose administrations daily, for one or several days. Guidance can be found in the literature for appropriate dosages for given classes of pharmaceutical products.

The terminology used herein is for the purpose of describing particular aspects only and is not intended to be limiting.

As used in the specification and the appended claims, the singular forms "a," "an" and "the" can include plural referents unless the context clearly dictates otherwise. Thus, for example, reference to "a compound" includes mixtures of compounds, reference to "a pharmaceutical carrier" includes mixtures of two or more such carriers, and the like.

Ranges may be expressed herein as from "about" one particular value, and/or to "about" another particular value. The term "about" is used herein to mean approximately, in the region of, roughly, or around. When the term "about" is used in conjunction with a numerical range, it modifies that range by extending the boundaries above and below the numerical values set forth. In general, the term "about" is used herein to modify a numerical value above and below the stated value by a variance of 20%. When such a range is expressed, an aspect includes from the one particular value and/or to the other particular value. Similarly, when values are expressed as approximations, by use of the antecedent "about," it will be understood that the particular value forms an aspect. It will be further understood that the endpoints of each of the ranges are significant both in relation to the other endpoint, and independently of the other endpoint.

The word "or" as used herein means any one member of a particular list and also includes any combination of members of that list.

"Inhibit," "inhibiting," and "inhibition" mean to diminish or decrease an activity, response, condition, disease, or other biological parameter. This can include, but is not limited to, the complete ablation of the activity, response, condition, or disease. This may also include, for example, a 10% inhibition or reduction in the activity, response, condition, or disease as compared to the native or control level. Thus, in an aspect, the inhibition or reduction can be a 10, 20, 30, 40, 50, 60, 70, 80, 90, 100 percent, or any amount of reduction in between as compared to native or control levels. In an aspect, the inhibition or reduction is 10-20, 20-30, 30-40, 40-50, 50-60, 60-70, 70-80, 80-90, or 90-100 percent as compared to native or control levels. In an aspect, the inhibition or reduction is 0-25, 25-50, 50-75, or 75-100 percent as compared to native or control levels.

"Modulate", "modulating" and "modulation" as used herein mean a change in activity or function or number. The change may be an increase or a decrease, an enhancement or an inhibition of the activity, function or number.

"Promote," "promotion," and "promoting" refer to an increase in an activity, response, condition, disease, or other biological parameter. This can include but is not limited to the initiation of the activity, response, condition, or disease. This may also include, for example, a 10% increase in the activity, response, condition, or disease as compared to the native or control level. Thus, in an aspect, the increase or promotion can be a 10, 20, 30, 40, 50, 60, 70, 80, 90, 100 percent, or more, or any amount of promotion in between compared to native or control levels. In an aspect, the increase or promotion is 10-20, 20-30, 30-40, 40-50, 50-60, 60-70, 70-80, 80-90, or 90-100 percent as compared to native or control levels. In an aspect, the increase or promotion is 0-25, 25-50, 50-75, or 75-100 percent, or more, such as 200, 300, 500, or 1000 percent more as compared to native or control levels. In an aspect, the increase or promotion can be greater than 100 percent as compared to native or control levels, such as 100, 150, 200, 250, 300, 350, 400, 450, 500 percent or more as compared to the native or control levels.

As used herein, the term "determining" can refer to measuring or ascertaining a quantity or an amount or a change in activity. For example, determining the amount of a disclosed polypeptide in a sample as used herein can refer to the steps that the skilled person would take to measure or ascertain some quantifiable value of the polypeptide in the sample. The art is familiar with the ways to measure an amount of the disclosed polypeptides and disclosed nucleotides in a sample.

The term "sample" can refer to a tissue or organ from a subject; a cell (either within a subject, taken directly from a subject, or a cell maintained in culture or from a cultured cell line); a cell lysate (or lysate fraction) or cell extract; or a solution containing one or more molecules derived from a cell or cellular material (e.g., a polypeptide or nucleic acid). A sample may also be any body fluid or excretion (for example, but not limited to, blood, urine, stool, saliva, tears, bile) that contains cells or cell components.

The invention will be further described with reference to the following examples; however, it is to be understood that the invention is not limited to such examples. Rather, in view of the present disclosure that describes the current best mode for practicing the invention, many modifications and variations would present themselves to those of skill in the art without departing from the scope and spirit of this invention. All changes, modifications, and variations coming within the meaning and range of equivalency of the claims are to be considered within their scope.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

EXAMPLES

For the Examples described below, the following materials, methods and protocols were utilized.

Materials and Methods

Animals: Six to twelve-week-old C57BL6/J mice (B6 mice), B6.Cg-Tg(HLA-A/H2-D)2Enge/J transgenic breeder mice expressing human HLA-A2 gene (AAD mice), and IFNAR-/- (B6.12952-Ifnar1tm1Agt/Mmjax) gene knockout breeder mice obtained from Jackson laboratories (Bar harbor, ME) were housed under specific-pathogen free conditions. Animal husbandry, breeding, and experimental procedures were performed as per IACUC protocols approved by the DLAR.

Peptides and Reagents: Peptides and Reagents: cGMP grade R-DOTAP and S-DOTAP (1,2-dioleoyl-3-trimethyl ammonium-propane) were provided by Merck & Cie, Shaffhausen, Switzerland. cGMP grade R-DOTAP liposomal nanoparticles were produced by standard liposome manufacturing processes. Peptide antigens (KF18: KSSGQAEPDRAHYNIVTF (SEQ ID NO:3), SF9: SIINFEKL (SEQ ID NO:1), RF9: RAHYNIVTF (SEQ ID NO:2) were synthesized and purified to >95% purity by GenScript, Piscataway, New Jersey, USA. All other cationic lipids were purchased from Avanti polar Lipids, Birmingham, AL.

Cell lines and bone marrow derived dendritic cells culture: Primary bone marrow derived dendritic cells were obtained by culturing the hematopoietic bone marrow cells for 8 days in complete RPMI media (RPMI media containing 10% FBS, 1 mM L-glutamine, 1 mM sodium pyruvate, 1×MEM non-essential amino acids, 50 µM β-mercaptoethanol, 100 u/ml penicillin, 100 u/ml streptomycin) supplemented with recombinant mouse GM-CSF and IL-4 (for conventional BMDCs (cDCs)) or recombinant flt3 ligand (for plasmacytoid BMDCs (pDCs)). B16-Blue™ IFN-α/β Cells used for detecting cationic lipid induced type I IFN was purchased from InvivoGen, San Diego, California, USA, and cell cultures were maintained and according to the manufacturer's protocol.

IFN reporter cell assay and Cell phenotypic analysis: For detecting IFN, the supernatants from type I IFN producing cells were added to B16-Blue™ IFN-α/β Cells in a 96 well plate. After 24 hr incubation, the supernatants were assayed for SEAP activity using QUANTI-Blue™ reagent (InvivoGen, USA) according to manufacturer's instructions. Briefly, 50 µl of cell supernatants containing SEAP was mixed with 150 µl QUANTI-Blue™ reagent and incubated for 3-4 hr at 37° C. and absorbance was measured at 650 nm using a spectrometer. The concentrations of type I IFN in test samples were quantified using a standard curve generated from recombinant type I IFNβ treated B16-Blue™ IFN-α/β Cells in the same assay. To measure CD69 expression, single cell suspensions of lymph nodes were stained with fluorochrome conjugated CD3, and CD69 and percent CD69+ CD3+ T cells in each draining lymph node were measured using flowcytometry.

RNA isolation, Nano string Analysis, and gene expression assay: For gene expression analysis, draining popliteal lymph nodes (n=4) were enzymatically digested using cell dissociation cocktail for 60 min at 37° C., and single cell suspensions were used to sort CD11c+ ells using Sony SY3200 cell sorter. Sort purified CD11c+ cells (25K cells) were lysed in Qiagen's RLT cell lysis buffer (Qiagen, USA) and total RNA was isolated using Qiagen total RNA isolation kit (Qiagen, USA). Total RNA obtained was sent to University of Kentucky genomics core laboratory (Lexington, KY) where total RNA was mixed with Ncounter™ mouse inflammation panel (Nano String Technologies, Seattle, WA) which can measure over 547 genes involved in immune response. Binding of mRNA was detected with Nanso String nCounter analysis system, and raw count data was normalized and statistically analyzed using SAS program by UK genomics core laboratory. For confirmation studies using RT-PCR, the lymph nodes were directly lysed in RLT cell lysis buffer, and the total isolation RNA was reverse transcribed to cDNA using QuantiTect reverses transcription kit (Qiagen, USA). The cDNA was then amplified using TaqMan gene expression system (Applied biosystems, USA) to detect and quantify mouse IFNα and IFNβ transcripts relative to GAPDH expression using quantitative PCR reaction.

Vaccination and Assessment of antigen specific T cell responses: Mice were anesthetized mice using isoflurane, and the injection site was shaved and cleaned with 70% ethanol prior to vaccination. For assessing antigen specific T cell response using ELISPOT, mice were vaccinated two doses (100 µl/dose) of vaccine formulation containing cationic lipid and antigenic peptides delivered at 7 day intervals or one dose of CFA formulation prepared by emulsifying equal volumes of complete freund's adjuvant and antigenic peptide delivered on day 0. Antigen specific responses were assessed 14 days after the first vaccine. For measuring antigen specific responses, spleen cells from the euthanized mice were used to detect antigen specific T cell responses using an IFN-γ ELISPOT Assay (Mabtech, Inc, Cincinnati, Ohio, USA). For IFN-γ ELISPOT assays, $2.5 \times 10^5$ processed spleen cells were stimulated for 18-24 hr at 37° C. with CD8 T cell epitopes of interest in a 96 well plate pre-coated with the mouse IFN-γ capture antibody. After stimulation, wells were washed with PBS and incubated with biotin-conjugated anti-IFNγ antibody followed by the streptavidin-HRP antibody. To visualize the antigen specific IFN-γ producing cells, wells were incubated for 6 minutes with TMB substrate, washed with water, and air dried. Spots were scanned and counted using CTL ImmunoSpot Analyzer and ImmunoSpot Ver.4 software (Cellular Technology Limited, Cleveland, Ohio, USA). Spot counts were summarized as median values from triplicate samples. Each sample had unstimulated and a PMA/Ionomycin control wells to detect background and positive control. Wells were considered positive if the spot count exceeded 5 spots and antigen specific response as positive if the spot count is more than three-fold compared to controls.

Example 1

R-DOTAP Induces Type I Interferon Gene Expression in Draining Lymph Nodes

To assess cationic nanoparticle induced gene expression, C57BL/6J mice were injected with 100 µl of 12 mM R-DOTAP nanoparticles subcutaneously behind the neck, and inflammatory gene expression in draining lymph nodes analyzed 4 or 24 hours post vaccination. Mice injected with PBS, and LPS (50 µg/mouse) (24 h time point) were used as negative and positive controls respectively. 4 h or 24 hr after injection, axillary and brachial draining lymph nodes from each mouse were pooled and processed by collagenase digestion. Activated dendritic cells ($CD11c^+$) cells in the lymph node cell suspensions were sort-purified and lysed in RLT buffer and processed for relative gene expression analysis using nCounter® mouse inflammation kit and nanostring technologies. R-DOTAP injection was found to significantly alter the expression of several inflammatory genes at both time points. Several genes including IFN-1α and IFN-1β showed increases greater than 5-fold higher than LPS which was used as a positive control. Expression of other genes including Cxcl10 were also significantly increased and more comparable to levels induced by LPS (FIG. 1).

Example 2

Figure 2:
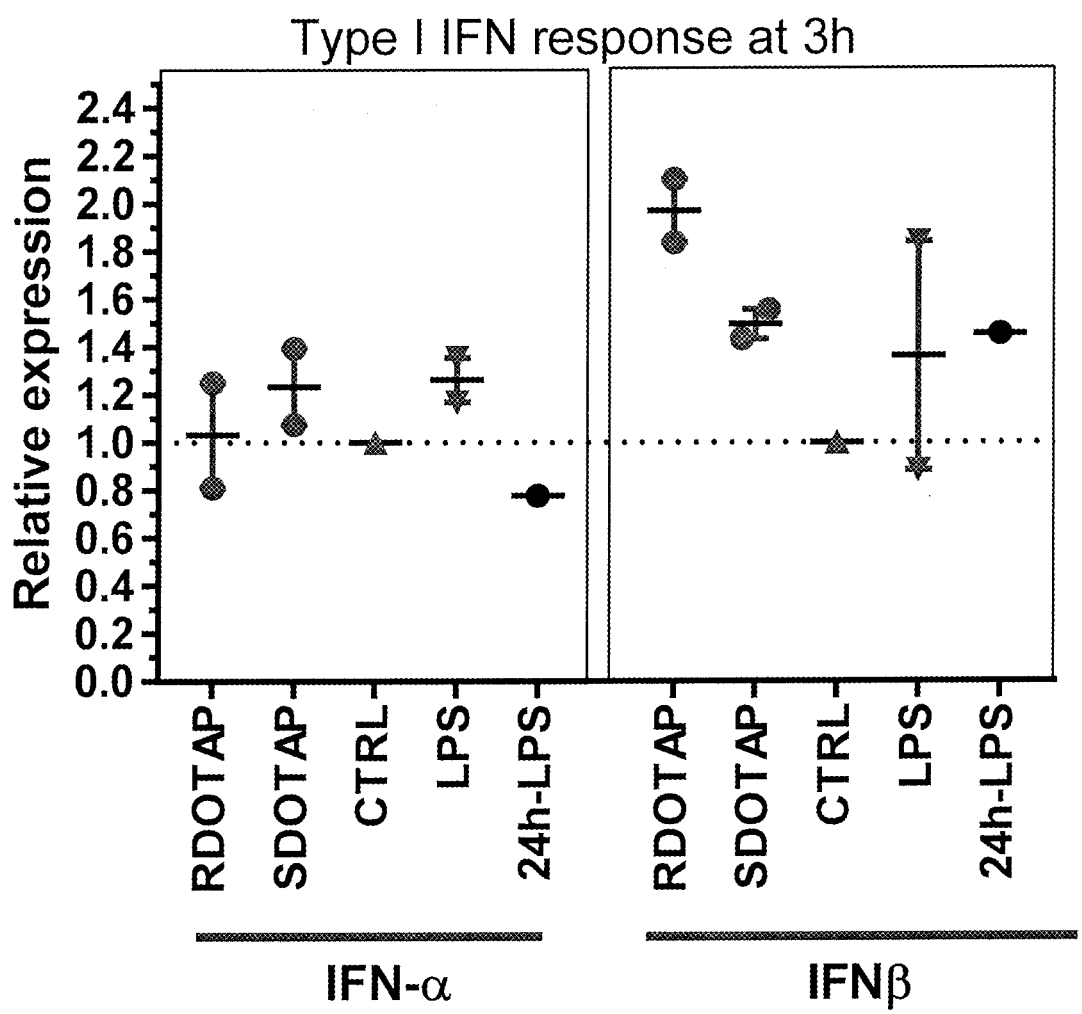
FIG. 2 provides a graph demonstrating R-DOTAP induced type IFN gene expression in draining lymph nodes. The data in FIG. 2 corresponds to an experiment wherein C57BL/6J mice (n=2) were injected with 50 µl of 6 mM R-DOTAP or S-DOTAP nanoparticles subcutaneously in the foot pads. Mice injected with PBS, and LPS (50 µg/mouse) (24 h time point) were used as negative and positive controls respectively. 3 h or 24 hr after injection, popliteal draining lymph nodes from each mouse were pooled and lysed in RLT buffer and processed for relative gene expression analysis using Taqman gene expression assay and RT-PCR. Data demonstrate up-regulation of the type I interferon genes by both S-DOTAP and R-DOTAP.

R-DOTAP and S-DOTAP Both Induce Interferon-α and Interferon-β Gene Expression in Draining Lymph Nodes To compare type I Interferon gene expression by both R- and S-DOTAP, a similar study as outlined in Example 1 was performed. C57BL/6J mice were injected with 50 μl of 6 mM RDOTAP nanoparticles subcutaneously in the foot pads. Mice injected with PBS, and LPS (50 μg/mouse) (24 h time point) were used as negative and positive controls respectively. 3 h or 24 hr after injection, popliteal draining lymph nodes from each mouse were pooled and lysed in RLT buffer and processed for relative gene expression analysis using Taqman® gene expression assay and RT-PCR. The studies confirm that both R- and S-DOTAP are strong inducers of the type I interferons (FIG. 2).

Example 3

Figure 3A:
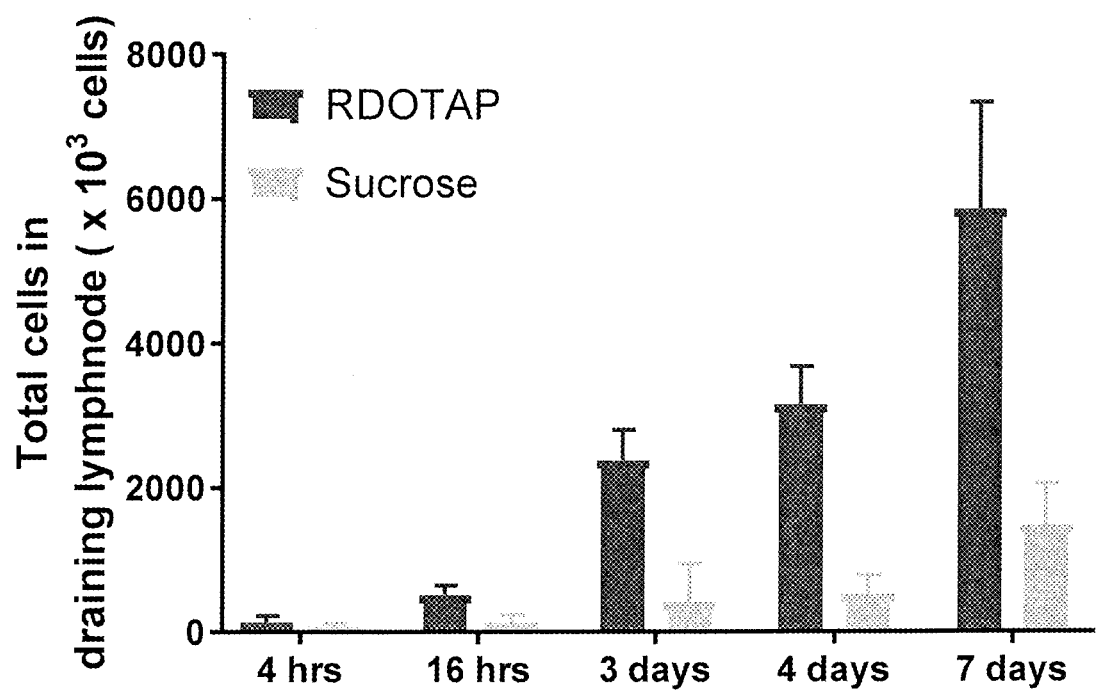
FIGS. 3A, 3B, and 3C provide graphs demonstrating R-DOTAP induced cell recruitment and CD69 expression in draining lymph nodes. The data in FIG. 3 corresponds to an experiment wherein A) C57BL/6J mice (n=3) were injected with 50 µl of 6 mM R-DOTAP or 280 mM Sucrose subcutaneously in the foot pads. At indicated times popliteal draining lymph nodes from each mouse were isolated and single suspensions of lymph nodes were enumerated using hemocytometer to obtain total cell numbers. B) C57BL/6J (n=3) or IFNAR−/− (n=3) mice were injected with 50 µl of 6 mM R-DOTAP or 280 mM sucrose in the foot pad and draining popliteal lymph nodes were harvested from each mouse and enzymatically digested lymph nodes were assessed for the total cell number at 24 hr (B) using hemocytometer and expression of CD69 on CD3+ T cells (B) was assessed using flowcytometry. A-B) data represent total number of cells in each draining lymph node. C) Data represent percent CD69+ cells each group 24 hr after vaccination (n=3 mice per group).
Figure 3B:
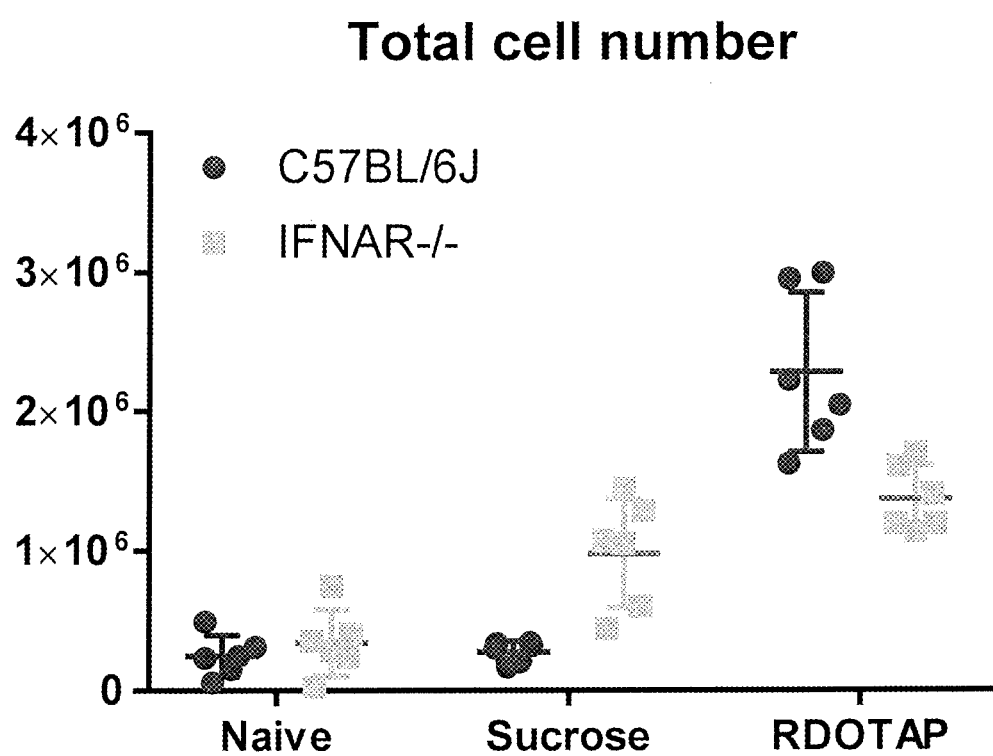
Figure 3C:
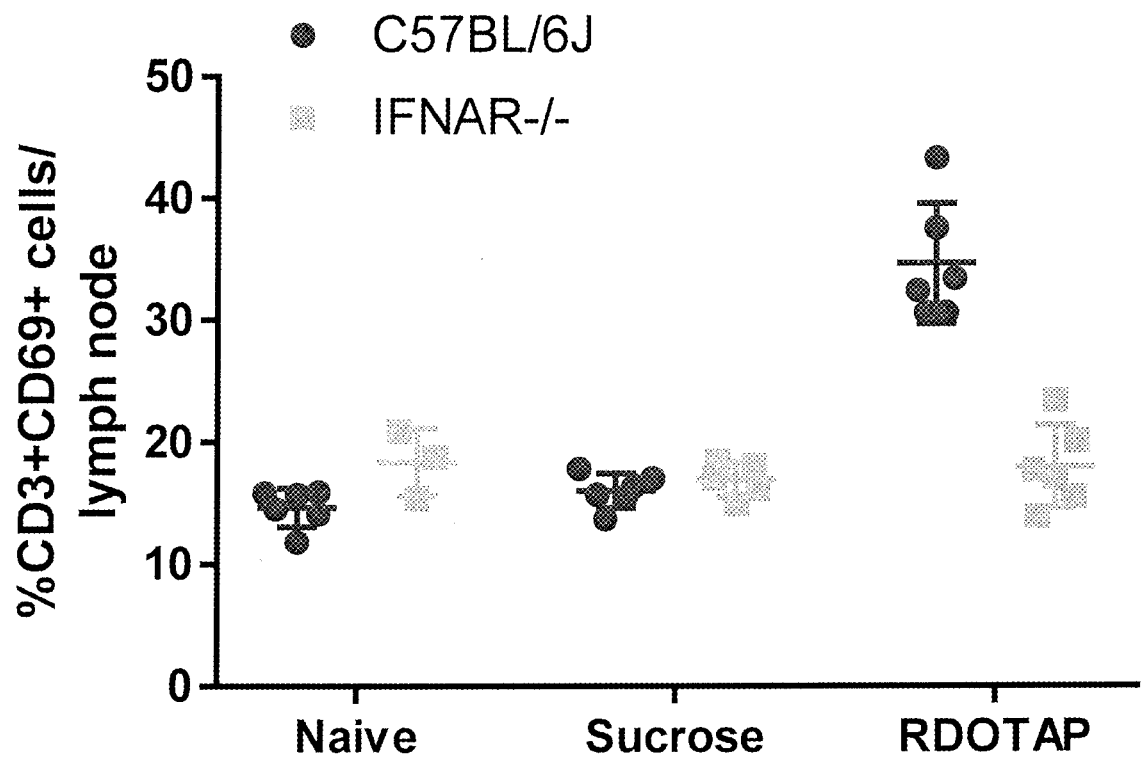

R-DOTAP and S-DOTAP Upregulate Type I Interferon-Associated CD69 Expression on T-cells To further understand the effect and ability of cationic lipids to activate the type I interferons, C57BL/6J mice or IFNAR−/− mice were injected with 50 μl of 6 mM R-DOTAP nanoparticles or 6 mM S-DOTAP or 280 mM sucrose subcutaneously in the foot pads. 24 hr after injection, popliteal draining lymph nodes from each mouse were isolated and single cell suspensions of lymph nodes were stained with fluorochrome conjugated CD3 and CD69. R-DOTAP alone (without antigen) resulted in a visible increase in DLN size and this was due to a steady increase in total cell number over a 7-day period (FIG. 3A). Studies of T-Cell influx into the DLN with pertussis toxin suggest that lipids structurally related to R-DOTAP induce lymph node homing chemokines, most likely a direct result of type I IFN signaling. This increase in total cell number was confirmed to be dependent on type I IFN signaling as it was greatly reduced in the IFNαR knock-out mouse (FIG. 3B). Type I IFN is known to inhibit lymphocyte egress from lymphoid organs through the up-regulation of CD69 which, in turn, inhibits the sphingosine 1 phosphate receptor required for lymphocyte egress. We therefore postulated that injection of both S-DOTAP and R-DOTAP would result in the upregulation of CD69 in the DLN. Indeed, subcutaneous injection of both cationic lipids in wild type mice resulted in the up-regulation of CD69 most strongly in T cells. In contrast, no CD69 upregulation was seen after R-DOTAP injection of IFNαR knock-out mice, demonstrating that the R-DOTAP induced up regulation of CD69 is type I IFN dependent (FIG. 3C). The data represents % CD69+CD3+ T cells in each draining lymph node.

Example 4

Various Cationic Lipids Upregulate Type I Interferons

Figure 4A:
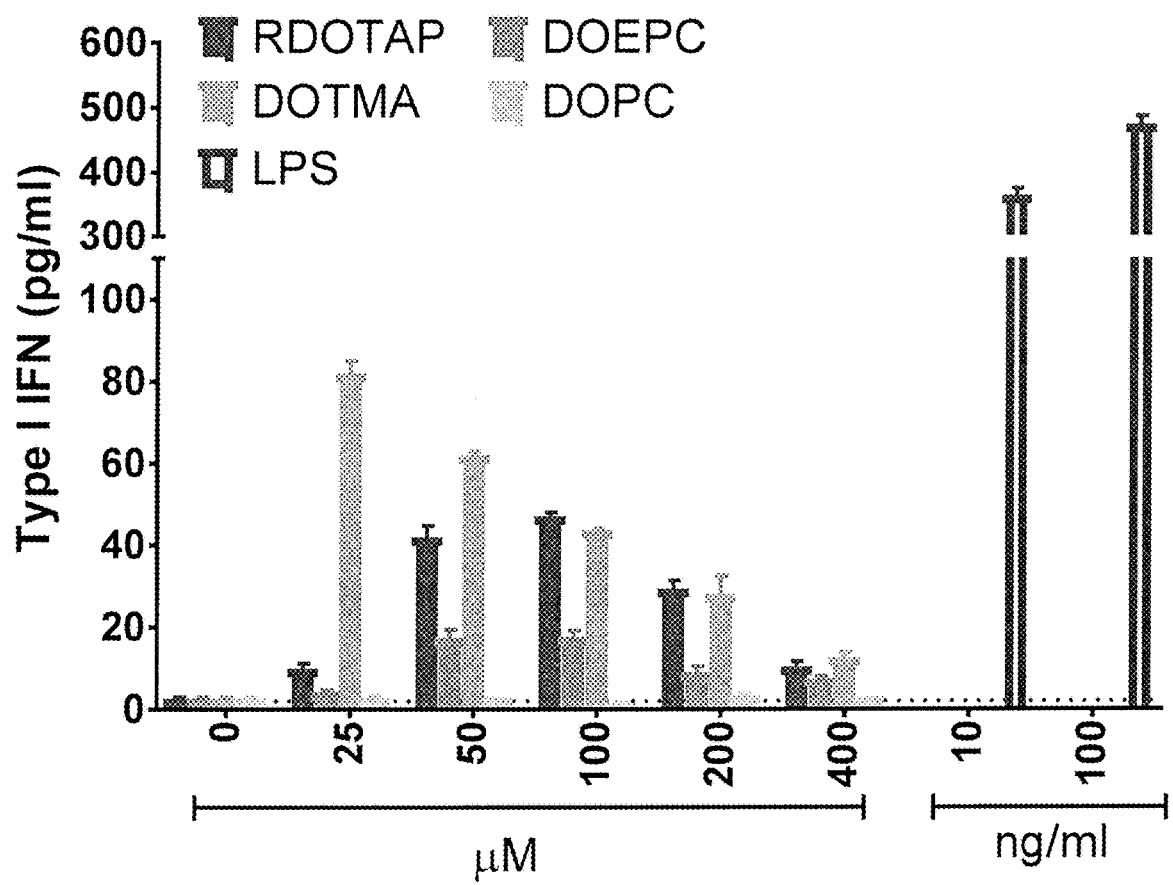
Figure 4B:
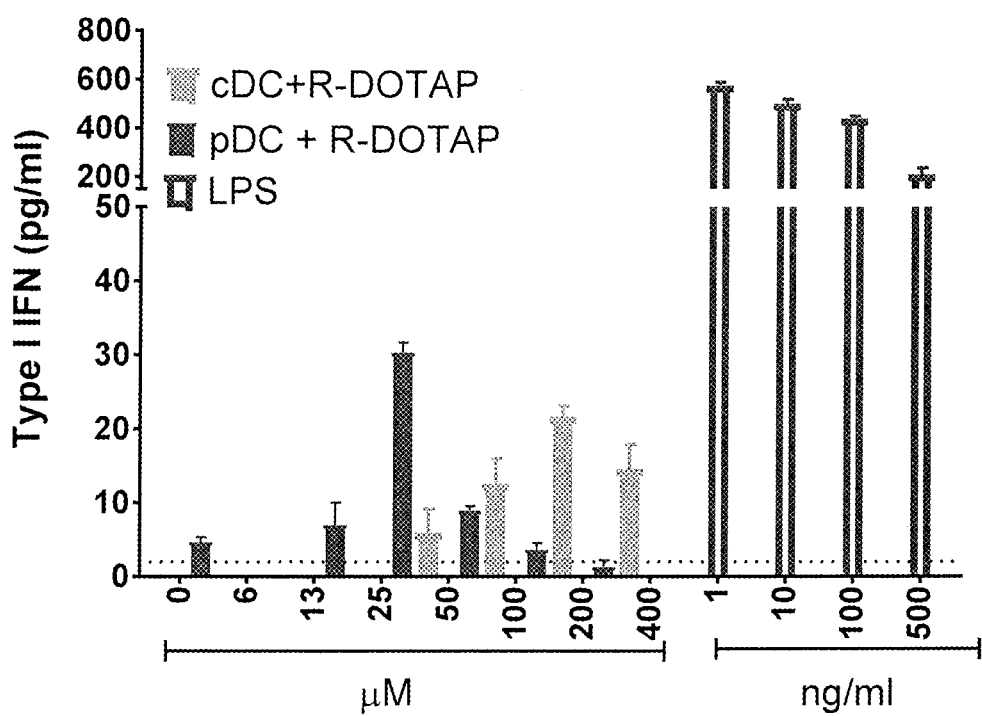

Studies were performed in-vitro to evaluate the potential of various cationic lipids to induce the type I interferons. In this study the cationic lipids DOTAP, DOEPC and DOTMA were studied. The neutral lipid DOPC was also evaluated to confirm the specificity of the interferon up-regulation to cationic lipids. In one study, bone marrow derived dendritic cells (BMDCs) from IFNAR-Ko mice were stimulated with indicated (6-400 μM) concentrations of cationic lipids or LPS positive control (1-500 ng/ml) for 24 hrs (FIG. 4A). In a second study, FLT3-induced BMDCs (pDCs) and GM-CSF/IL-4 derived BMDC (cBMDCs) were stimulated with indicated concentration (6-400 μM) concentrations of R-DOTAP or LPS positive control (1-500 ng/ml) for 24 hrs (FIG. 4B). To measure type I interferon production, the cell supernatants (100 μl) were added to reporter cell (B16.Blue-IFNα/β cell from invivogen, USA) cultures and incubated for 18 hs to stimulate the type I interferon induced production of secreted alkaline phosphatase (SEAP) by reporter cells. The SEAP activity in the reporter cell supernatants was quantified using colorimetric SEAP assay kit according to the manufacture protocol. BMDC secreted type I Interferons were quantified using a standard curve is generated using recombinant mouse IFN-β stimulated SEAP activity in the reporter cell line. The studies confirm that the ability to upregulate the type I interferons is not specific to DOTAP but can be activated by multiple cationic lipids. It also confirms the inability of neutral lipids to activate the type I interferon pathway.

Example 5

Figure 5A:
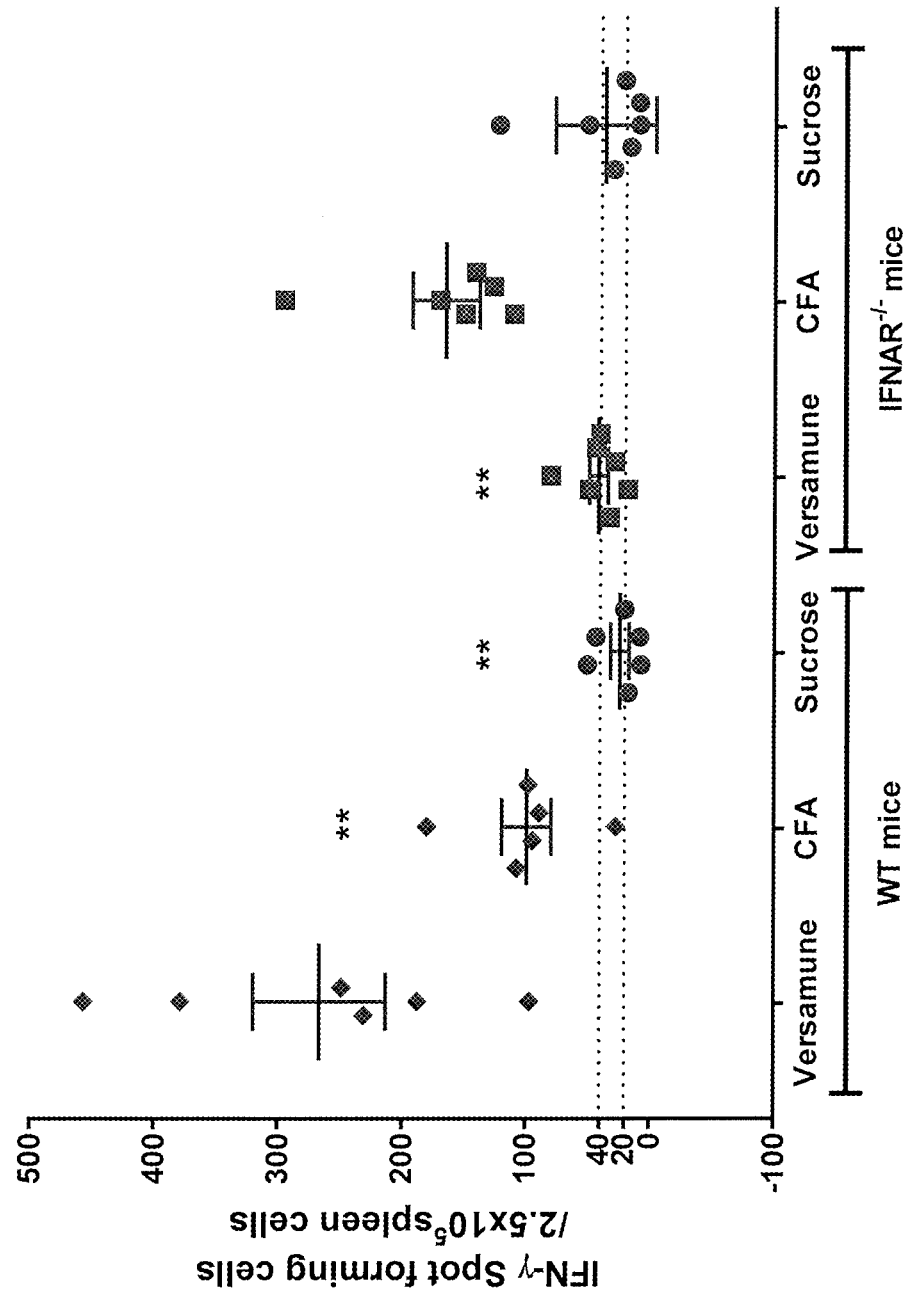
FIGS. 5A and 5B provide graphs demonstrating R-DOTAP based vaccine efficacy in type I IFN signal deficient mice. The data in FIG. 5 correspond to an experiment mice. The data in FIG. 5 correspond to an experiment wherein C57BL/6J mice (n=6) or IFNAR −/− mice from Jackson were injected subcutaneously with 100 µl of vaccine formulations (Versamune® or complete Freund's adjuvant) containing SIINFEKL peptide.
Figure 5B:
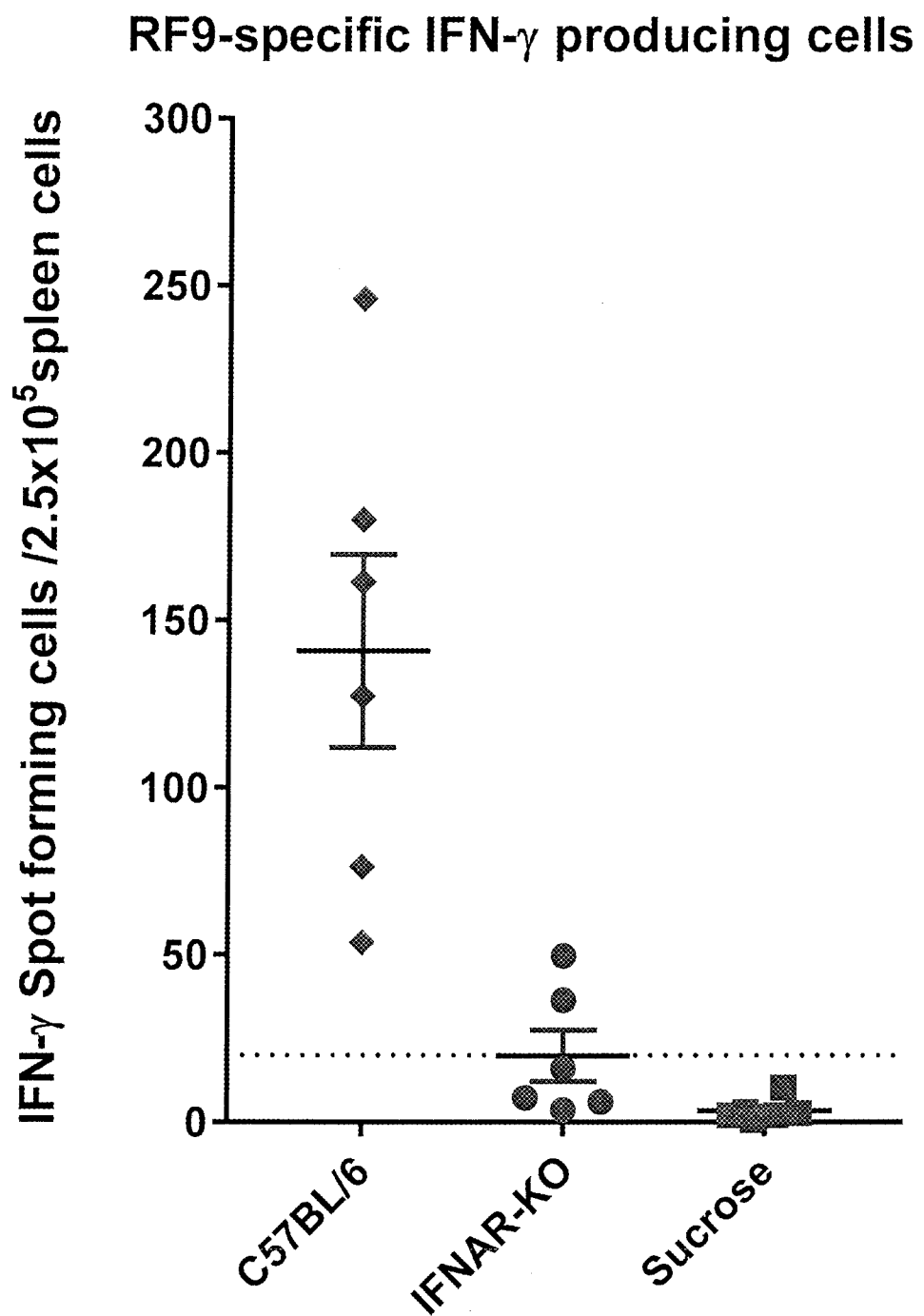

Diminished Cationic Lipid Mediated CD8+ T-Cell Response is Observed in Type I IFN-Deficient Mice The demonstrated upregulation of Type I IFN-genes by cationic lipids, suggests that cationic lipids target the type I IFN pathway to induce robust CD8+ T-cell responses. To further confirm this hypothesis, an R-DOTAP formulation containing a well-characterized mouse CD8+ T-cell epitope (SIINFEKL (SEQ ID NO:1)) of chicken ovalbumin or HPV16-E7 protein derived CD8 T cell epitope (RF9: RAHYNIVTF (SEQ ID NO:2)) was administered to wild-type C57BL/6J mice and to type I interferon signal deficient IFNAR−/− mice on days 0 and on day 7. Mice were also vaccinated with complete Freund's adjuvant (CFA)+SIINFEKL. The peptide-only vaccine was used as a positive control. On day 14, antigen-specific (SIINFEKL) CD8+ T cell responses induced by R-DOTAP or CFA were assessed using the IFN-γ ELISPOT assay. As shown in FIG. 5A, vaccinating wild-type mice with the DOTAP formulation induced robust antigen-specific CD8+ T cell responses that are higher in magnitude than the CFA-adjuvanted formulation. In contrast, the CD8+ T cell response induced by R-DOTAP is dramatically reduced in the IFNAR−/− mice, although no such difference is noted with the CFA-adjuvanted formulation. We observed similar results (FIG. 5B) even with a tumor associated antigen expressed by HPV16 positive tumors. It is well documented that CFA adjuvant targets multiple TLR pathways and hence can bypass the requirement for type I IFN signaling to induce antigen-specific CD8+ T cell responses.

The loss of the cationic lipid-induced efficacy in the mice devoid of type I IFN signaling, coupled with the demonstrated ability to strongly activate type I IFN genes, strongly demonstrates that R-DOTAP effectively facilitates antigen cross presentation and also simultaneously activates the type I IFN pathway to drive robust antigen-specific CD8+ T-cell immune responses (FIG. 5).

What is claimed is:

1. A method for activating a type I IFN signaling pathway by inducing type I interferon gene expression in a subject, the method comprising:
   administering a therapeutically effective amount of a composition comprising (R)-1,2-dioleoyl-3-trimethyl-ammonium propane (R-DOTAP) and a pharmaceutical carrier to the subject, wherein the R-DOTAP induces type I gene, and
   detecting the induction-of type I IFN gene expression by the R-DOTAP in the composition.

2. The method of claim 1, wherein a T-cell response is elevated.

* * * * *

SEQUENCE LISTING

<160> NUMBER OF SEQ ID NOS: 3

<210> SEQ ID NO 1
<211> LENGTH: 8
<212> TYPE: PRT
<213> ORGANISM: Artificial Sequence
<220> FEATURE:
<223> OTHER INFORMATION: Synthetic

<400> SEQUENCE: 1

Ser Ile Ile Asn Phe Glu Lys Leu
1               5

<210> SEQ ID NO 2
<211> LENGTH: 9
<212> TYPE: PRT
<213> ORGANISM: Artificial Sequence
<220> FEATURE:
<223> OTHER INFORMATION: Synthetic

<400> SEQUENCE: 2

Arg Ala His Tyr Asn Ile Val Thr Phe
1               5

<210> SEQ ID NO 3
<211> LENGTH: 18
<212> TYPE: PRT
<213> ORGANISM: Artificial Sequence
<220> FEATURE:
<223> OTHER INFORMATION: Synthetic

<400> SEQUENCE: 3

Lys Ser Ser Gly Gln Ala Glu Pro Asp Arg Ala His Tyr Asn Ile Val
1               5                   10                  15

Thr Phe